US007318069B2

(12) United States Patent
Takahashi et al.

(10) Patent No.: US 7,318,069 B2
(45) Date of Patent: Jan. 8, 2008

(54) FOUND-ITEM INFORMATION MANAGEMENT SERVER, FOUND-ITEM INFORMATION MANAGEMENT PROGRAM, AND FOUND-ITEM INFORMATION MANAGEMENT METHOD

(75) Inventors: Junji Takahashi, Miyagi (JP); Eri Munekata, Miyagi (JP); Tooru Tadano, Miyagi (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 10/379,559

(22) Filed: Mar. 6, 2003

(65) Prior Publication Data

US 2004/0002998 A1   Jan. 1, 2004

(30) Foreign Application Priority Data

Jun. 28, 2002   (JP) ............................. 2002-188920

(51) Int. Cl.
*G06F 17/30* (2006.01)
(52) U.S. Cl. ........................... 707/104.1; 707/3; 707/6; 340/572.1
(58) Field of Classification Search ..................... 707/1, 707/3, 2, 6, 10, 101, 102, 104.1, 200; 705/1, 705/14; 709/206, 216, 219; 235/383, 385; 340/572.1
See application file for complete search history.

(56) References Cited

U.S. PATENT DOCUMENTS 5,809,481 A  *  9/1998  Baron et al. ................... 705/14
6,259,367 B1 *  7/2001  Klein ....................... 340/572.1
6,449,611 B1 *  9/2002  Frankel et al. ................. 707/6
6,598,791 B2 *  7/2003  Bellis, Jr. et al. ........... 235/383
6,654,758 B1 * 11/2003  Teague ........................ 707/101
6,662,078 B1 * 12/2003  Hardgrave et al. ......... 700/226
2001/0053981 A1 * 12/2001  Wyssen ......................... 705/1

(Continued)

FOREIGN PATENT DOCUMENTS

JP          2001-206516          7/2001

(Continued)

OTHER PUBLICATIONS

Japanese Office Action dated Sep. 13, 2005 in corresponding Japanese Application No. 2002-188920.

(Continued)

*Primary Examiner*—Shahid A Alam
(74) *Attorney, Agent, or Firm*—Staas & Halsey LLP

(57) ABSTRACT

A found-item information management server is able to hand a lost item over to the owner early with a high probability. When the finder of a found item sends found-item information to the found-item information management server using a first terminal, a found-item reporting unit registers the found-item information, partly as secret particular information, in a found-item information database. Thereafter, the owner of the found item sends a request to refer to the found-item information registered in the found-item information database using a second terminal. An information disclosing unit sends the found-item information registered in the found-item information database, except for the particular information, to the second terminal. When the owner sends lost-item information to the found-item information management server using the second terminal, a match determining unit determines a match between the lost-item information and the particular information stored in the found-item information database, and sends a determined result to the second terminal.

1 Claim, 25 Drawing Sheets

U.S. PATENT DOCUMENTS

2002/0072924 A1* 6/2002 Gray .............................. 705/1
2003/0083939 A1* 5/2003 Wohl ........................... 705/14

FOREIGN PATENT DOCUMENTS

| JP | 2002-14695 | 1/2002 |
| JP | 2002-157508 | 5/2002 |
| WO | WO 03/058397 A2 * | 7/2003 |

OTHER PUBLICATIONS

Japanese Patent Abstract No.: 09-091340 dated Apr. 4, 1997.
Japanese Patent Abstract No.: 2001-306589 dated Nov. 2, 2001.

* cited by examiner

FIG. 5

110 LOST-ITEM INFORMATION DB

| No. | NAME OF LOST ITEM | FEATURE INFORMATION (OPEN TO THE PUBLIC) | | | PARTICULAR INFORMATION (CAN BE OPEN TO THE PUBLIC IF MARKED WITH *) | | | ... |
|---|---|---|---|---|---|---|---|---|
| | | COLOR | TYPE | IMAGE | PARTICULAR 1 | PARTICULAR 2 | PARTICULAR 3 | |
| BXX011 | WALLET | BROWN | DOUBLE FOLDED | ... | CONTENTS:* CASH CARD | CASH: 20,000 | | ... |
| BXX012 | BAG | BLACK | SECOND BAG | ... | CONTENTS:* KEY | CONTENT:* MIRROR | CONTENT:* LIGHTER | ... |
| ... | ... | ... | ... | ... | ... | ... | ... | ... |

| DATE AND TIME INFORMATION | | LOCATION INFORMATION | | RE-PORTER | HAND-OVER OF FOUND ITEM | | | FOUND-ITEM MATCHING NOTIFICATION | |
|---|---|---|---|---|---|---|---|---|---|
| LOST | RE-PORTED | LOST | REPORTED | | No. | DATE AND TIME | REMUNER-ATION | No. | DATE AND TIME |
| 020301 20:00 | 020301 22:00 | NEAR SENDAI STATION | SYSTEM | CX102 | BX011 | 020302 09:00 | CASH: 20,000 | | |
| 020301 23:00 | 020302 8:00 | AT CROSSING XX ON AOBA STREET | POLICE BOX AA | CX105 | | | | AXX002 | 020301 23:00 |
| ... | ... | ... | ... | ... | ... | ... | ... | ... | ... |

120 FOUND-ITEM INFORMATION DB

| No. | NAME OF FOUND ITEM | FEATURE INFORMATION (OPEN TO THE PUBLIC) |  |  |  | PARTICULAR INFORMATION (NOT OPEN TO THE PUBLIC) |  |  |  |
|---|---|---|---|---|---|---|---|---|---|
|  |  | COLOR | TYPE | ... | IMAGE | PARTICULAR 1 | PARTICULAR 2 | PARTICULAR 3 | ... |
| AXX001 | BAG | BLACK | SECOND BAG | ... | GXX001 | CONTENT: CIGARETTES | CONTENT: LIGHTER | CONTENT: KEY | ... |
| AXX002 | WALLET | BROWN | DOUBLE-FOLDED | ... | GXX002 | CASH: 20,000 | CONTENT: CASH CARD |  | ... |
| AXX003 | BAG | BLACK | SECOND BAG | ... | GXX001 | CONTENT: KEY | CONTENT: MIRROR | CONTENT: LIPSTICK | ... |
| ... | ... | ... | ... | ... | ... | ... | ... | ... | ... |

| DATE AND TIME INFORAMTION | | LOCATION INFORMATION | | RE-PORTER | STORAGE LOCATION | HAND-OVER TO OWNER | | DATE AND TIME WHEN REPORTER IS NOTIFIED |
|---|---|---|---|---|---|---|---|---|
| FOUND | RE-PORTED | FOUND | RE-PORTED |  |  | No. | DATE AND TIME |  |
| 020301 18:00 | 020301 20:00 | BEFORE DEPARTMENT STORE XX ON AOBA STREET | POLICE BOX AA | CX101 | POLICE BOX AA |  |  |  |
| 020301 21:00 | 020301 23:00 | SENDAI STATION, EAST SIDE | POLICE BOX BB | CX103 | CENTER | BX011 | 020302 09:00 | 020302 10:00 |
| 020301 23:00 | 020302 8:00 | AT CROSSING XX ON AOBA STREET | SYSTEM | CX104 | RE-PORTER |  |  |  |
| ... | ... | ... | ... | ... | ... | ... | ... | ... |

FIG. 6

130 REPORTER INFORMATION DB

| No. | NAME | TELEPHONE No. | E-MAIL ADDRESS | ADDRESS | MAP INFORMATION | PR INFORMATION |
|---|---|---|---|---|---|---|
| CXX101 | SATO ICHIRO | 022-XXX-XXXX | xxxx@xxx.com | SENDAI-SHI, TAIHAKU-KU | | |
| CXX102 | TANAKA MOMOKO | 022-XXX-XXXX | xxxx@xxx.com | SENDAI-SHI, AOBA-KU | | |
| CXX103 | SUZUKI TAKASI | 022-XXX-XXXX | xxxx@xxx.com | SENDAI-SHI, MIYAGINO-KU | | |
| CXX104 | AA STORE | 022-XXX-XXXX | xxxx@xxx.com | SENDAI-SHI, AOBA-KU | MX104.gif | ON SPECIAL SALE |
| CXX105 | SASAKI KAZUO | 022-XXX-XXXX | xxxx@xxx.com | SENDAI-SHI, TAIHAKU-KU | | |
| ... | ... | ... | ... | ... | | |

140 MEMBER SHOP INFORMATION DB

| No. | SHOP NAME | ADDRESS | TELEPHONE No. | E-MAIL ADDRESS | BANNER ADVERTISE-MENT | ONE-POINT PR | MERCHAN-DISE COUPON | FOUND-ITEM INFOR-MATION | ... |
|---|---|---|---|---|---|---|---|---|---|
| A010 | SNACK FUJI | KOKUBUN-CHO 1 | 022-123-3456 | xxx@xxx.com | a010.gif | 4/1 to 4/30 FRESHMAN SET | | | ... |
| ... | ... | ... | ... | ... | ... | ... | ... | ... | ... |
| A015 | AA STORE | KOKUBUN-CHO 2 | 022-xxx-xxxx | xxx@xxx.com | a011.gif | ............ | ... | ... | ... |
| ... | ... | ... | ... | ... | ... | ... | ... | ... | ... |

«LOST-ITEM REPORT»          31  02.03.02. 10:00
REPORTER              : CXX105 SASAKI KAZUO
LOST DATA AND TIME    : 02.03.01 17:00  32

LOST LOCATION         : AOBA STREET  33
NAME OF LOST ITEM     : BAG  34
(OPEN TO THE PUBLIC)
FEATURE INFORMATION   :
(OPEN TO THE PUBLIC)      35
·COLOR    :BLACK           ▼         IMAGE
·KIND     :SECOND BAG  ▼              REGISTRATION  36
·
·           37
PARTICULAR                    CAN BE OPEN   38
INFORMATION                   TO THE PUBLIC
(1) CONTENT     ▼  KEY           ▼ ☑
(2)             ▼                ▼ ☐

FIG.11

<<LIST OF SIMILAR FOUND ITEMS>> 41                          02.03.02 10:00

| No. | FEATURE | FOUND LOCATION: | IMAGE | SELECT |
|---|---|---|---|---|
| AXX001 | COLOR: BLACK, KIND: SECOND BAG, ... | BEFORE DEPARTMENT STORE XX ON AOBA STREET | REDUCED IMAGE | ☑ |
| AXX003 | COLOR: BLACK, KIND: SECOND BAG, ... | AT CROSSING XX ON AOBA STREET | | ☐ |
| ... | ... | ... | ... | ... |

END

FIG.12

<<FOUND-ITEM INFORMATION AND CONFIRMATORY MATTER INPUT SCREEN>>

FOUND-ITEM : AXX001    BAG
INFORMATION No.
FEATURE    : COLOR: BLACK, KIND: SECOND BAG
INFORMATION
· · ·

FOUND LOCATION : AOBA STREET
FOUND DATE    : 02.03.01  17:00
AND TIME

" PLEASE ENTER CONFIRMATORY
MATTERS (PARTICULAR INFORMATION)

(1) CONTENT  CIGARETTES ▶
(2) CONTENT  LIGHTER  ▶
· · ·

ENLARGED IMAGE

CAN BE OPEN
TO THE PUBLIC
☑
☑
☐

120 FOUND-ITEM INFORMATION

| No. | MEMBER SHOP SPECIFIC INFORMATION ||||| PROCESSING DETAILS |||||
|---|---|---|---|---|---|---|---|---|---|
| | REGISTERING INFORMATION |||| MERCHAND-ISE COUPON USAGE | PRESENT STATUS | DATE AND TIME | COM-MENTS | IMAGE |
| | SHOP No. | PERSON IN CHARGE | LO-CATION | COMMENTS | | | | | |
| AXX101 | A010 | 01 | WITHIN SHOP | | ... | TRANS-FERRED | 020323 17:00 | KOKUBUN-CHO POLICE BOX | |
| ... | ... | ... | ... | ... | ... | ... | ... | ... | ... |
| AXX502 | A015 | 03 | NEAR SHOP | WE ARE WAITING FOR YOU TO VISIT US | YES | HANDED OVER | 020323 18:00 | MERCHAND-ISE COUPON PURCHASED AT 1,000 YEN | GXX003 |
| ... | ... | ... | ... | ... | ... | ... | ... | ... | ... |
| AXX703 | A010 | 01 | WITHIN SHOP | WE ARE OPEN 18:00, AND CLOSED ON SUNDAYS | NO | SRORED | | | |
| ... | ... | ... | ... | ... | ... | ... | ... | ... | ... |

FIG.21

<<FOUND-ITEM LIST>>
NAME: BAG    FOUND DATE:02-03-20 ~    02.03.23 10:00    LOCATION: KOKUBUN-CHO

| | STORAGE LOCATION AND FOUND LOCATION | | | |
|---|---|---|---|---|
| IMAGE | SNACK FUJI (WITHIN SHOP) KOKUBUN-CHO 1 WE OPEN AT 18:00 AND ARE CLOSED ON SUNDAYS | SNACK FUJI | ☎022-123-3456 E-mail:xxx@xxx.com 4/1 ~ 4/30 FRESHMAN SET | MAP, ETC. |
| REDUCED IMAGE | STORE AA (NEAR) KOKUBUN-CHO 2 WE ARE WAITING FOR YOU TO VISIT US! | RESTAU-RANT | ☎022-123-3456 E-mail:xxx@xxx.com ORIGINAL MEAL | MAP, ETC. |
| REDUCED IMAGE | ... | ... | | |

"THIS SITE IS RUN ON GOODWILL. WHEN YOU RECEIVE FOUND ITEM, PLEASE PURCHASE MERCHANDISE, SOMETHING TO EAT OR DRINK, OR MERCHANDISE COUPON"

FIG.22

《FOUND-ITEM PROCESSING INPUT SCREEN》 02.03.23  17:00
REGISTERING SHOP : A010          SNACK FUJI

| REGIS-TRATION DATE | NAME | IMAGE | PROCESSED DETAILS | COMMENTS |
|---|---|---|---|---|
| 020316 | WALLET | REDUCED IMAGE | TRANS-FERRED ▶ | KOKUBUN-CHO POLICE BOX ▶ |
| 020322 | BAG | REDUCED IMAGE | ▶ | ▶ |
| ... | ... | ... | ... | ... |

BANNER : ADVERTISEMENT:ONE POINT: 4/1 to 4/30 FRESHMAN SET 2,000 YEN !

410 ITEM PARTICULAR INFORMATION

| ITEM NAME | PARTICULAR CATEGORY NO. NAME | PARTICULAR INFORMATION | | | |
|---|---|---|---|---|---|
| | | 1 | 2 | 3 | .. |
| .. | .. | .. | .. | .. | .. |
| LIGHTER | 1. KIND | THROWAWAY | GAS CHARGEABLE | OIL | .. |
| LIGHTER | 2. COLOR | RED | BLUE | SILVER | .. |
| .. | .. | .. | .. | .. | .. |
| CIGARETTES | 1. BRAND | AA SEVEN | BB START | .. | .. |
| .. | .. | .. | .. | .. | .. |

FIG.23

FOUND-ITEM INFORMATION MANAGEMENT SERVER, FOUND-ITEM INFORMATION MANAGEMENT PROGRAM, AND FOUND-ITEM INFORMATION MANAGEMENT METHOD

BACKGROUND OF THE INVENTION (1) Field of the Invention

The present invention relates to a found-item information management server, a found-item information management program, and a found-item information management method for managing information about lost items, and more particularly to a found-item information management server, a found-item information management program, and a found-item information management method for providing found-item information through a wide area network.

(2) Description of the Related Art

When a person finds a lost item in town, it is difficult for the finder to directly search for the owner of the found property and hand the found item over to the owner unless the found item carries some kind of description of the owner. Generally, it is customary for the finder to report the found item to an authorized organization, and for the owner to contact the organization to inquire about the item and, if lucky, to confirm the reported item and get hold of the property. In Japan, the authorized organization may be a police station, a police box, or a police post which has jurisdiction over the location where the lost item has been found.

For the finder of a lost-item to report the property, they need to take the trouble to go to an authority such as a police box and follow a certain procedure to file the report. If the finder finds the lost item at a location far away from a police box or does not know where a nearby police box is because the finder is a stranger around there, then the finder may find it highly troublesome to report to the authority. Since reporting a lost item to an authority such as a police box depends in reality on the goodwill of the finder, the possibility that the owner can recover the lost property is lower as the trouble that the finder has to take is greater.

Certain facilities such as train stations and department stores have a lost and found corner for temporarily keeping lost properties. Those lost and found corners may possibly reduce the burden on finders about the reporting of found items.

However, if there are available a plurality of places that a finder can report the lost item to, then the owner of the property cannot determine which one of those places the owner should ask for the lost item. Generally, when the owner of a lost item asks a place which is different from the place which the lost item has actually been reported to, the owner is unable to confirm that the lost property has been reported as a found item to the other place.

According the invention disclosed in Japanese laid-open patent publication No. 9-91340, networked terminals are set up in respective organizations including train stations and police boxes to allow those organizations to share information about lost items, so that the owner of a lost item can ask any one of those organizations to ascertain whether there has been a report on the lost item or not.

Private facilities, typically, department stores which have corners for temporarily keeping lost properties find those temporary storage offices lacking direct merits because keeping lost items and answering inquiries from owners is a labor-intensive task. At present, therefore, the facilities capable of sharing a database of information about found properties and providing a service of storing found properties are limited to public facilities such as train stations and some large private organizations such as large department stores which need to differentiate their services from other department stores. Since the database of information about found properties is shared among a limited number of organizations, the owner of a lost property can confirm whether the lost item has been reported or not only at those limited organizations or facilities.

It has been proposed to make the information about found properties available on a wide area network such as the Internet. However, the information about found properties available to anyone who has access to the wide area network tends to suffer the problem of poor security against unlawful actions. For example, if all the information about found properties is available on the wide area network, then it is impossible to prevent a third party from masquerading as the owner of a found item and claiming the found item unlawfully (the action for third party to masquerade as the owner of a found item will hereinafter be referred to as "owner masquerading").

The finder of a lost item has to go to one of the organizations which handle lost and found items and report the lost item to that organization. If there are a smaller number organizations available for accepting found items, then finders find it more troublesome to report the found property to one of those organizations. As a result, actions to report lost items are liable to be slow. The procedure that a finder must follow in reporting the found-item to an organization (e.g., a police box) is time-consuming because the finder is usually interviewed by a person (e.g., a police officer) in charge in the organization. Consequently, when a passerby who does not want to be bothered finds a lost property, they tend to walk away without picking up and reporting the lost item.

Heretofore, the percentage of found items that are reported is low and the recovery of lost-items by the owners is slow because, as described above, the information about found items should not be made available on a wide area network for the purpose of preventing owner masquerading, the finders of lost items need to take a lot of trouble in reporting those items, and the availability of facilities which accept and store found properties is restricted. As a consequence, the owners of lost items either cannot found their properties or take a long period of time before recovering their properties.

SUMMARY OF THE INVENTION

It is an object of the present invention to provide a found-item information management server, a found-item information management program, and a found-item information management method for providing information to allow the owner of a lost-item to recover the property early with a high probability.

To achieve the above object, there is provided a found-item information management server for managing information about lost items. The found-item information management server has found-item reporting means for accepting found-item information about a found item which is entered from a first terminal via a network, and registering the found-item information, partly as secret particular information, in a found-item information database, information disclosing means for sending the found-item information registered in the found-item information database, except for the particular information, to a second terminal in response to a request, which is entered from the second terminal via the network, to refer to the found-item information, and match determining means for accepting lost-item information about a lost item which is entered from the second terminal via the network, determining a match between the lost-item information and the particular information stored in the found-item information database, and sending a determined result to the second terminal.

To achieve the above object, there is also provided a found-item information management program for managing information about lost items. The found-item information management program enables a computer to perform a process comprising the steps of accepting found-item information about a found item which is entered from a first terminal via a network, and registering the found-item information, partly as secret particular information, in a found-item information database, sending the found-item information registered in the found-item information database, except for the particular information, to a second terminal in response to a request, which is entered from the second terminal via the network, to refer to the found-item information, and accepting lost-item information about a lost item which is entered from the second terminal via the network, determining a match between the lost-item information and the particular information stored in the found-item information database, and sending a determined result to the second terminal.

To achieve the above object, there is further provided a method of managing information about lost items with a computer. The method comprises the steps of accepting found-item information about a found item which is entered from a first terminal via a network, and registering the found-item information, partly as secret particular information, in a found-item information database, sending the found-item information registered in the found-item information database, except for the particular information, to a second terminal in response to a request, which is entered from the second terminal via the network, to refer to the found-item information, and accepting lost-item information about a lost item which is entered from the second terminal via the network, determining a match between the lost-item information and the particular information stored in the found-item information database, and sending a determined result to the second terminal.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a diagram showing a data structure of a lost-item information database.

FIG. 6 is a diagram showing a data structure of a found-item information database.

FIG. 7 is a diagram showing a data structure of a reporter information database.

FIG. 8 is a diagram showing a data structure of a member shop information database.

FIG. 11 is a diagram showing a lost-item reporting screen which is displayed.

FIG. 12 is a diagram showing a similar found-item list screen which is displayed.

FIG. 14 is a diagram showing a found-item information and confirmatory matter input screen which is displayed.

FIG. 19 is a diagram showing an example of member shop specific information added to a found-item information database.

FIG. 21 is a diagram showing a found-item list screen which is displayed.

FIG. 22 is a diagram showing a found-item processing input screen which is displayed.

FIG. 23 is a diagram showing a data structure of item particular information.

DESCRIPTION OF THE PREFERRED EMBODIMENT

First, the concept of an embodiment of the present invention will be described below, and then specific details of the embodiment of the present invention will be described later on.

Figure 1:
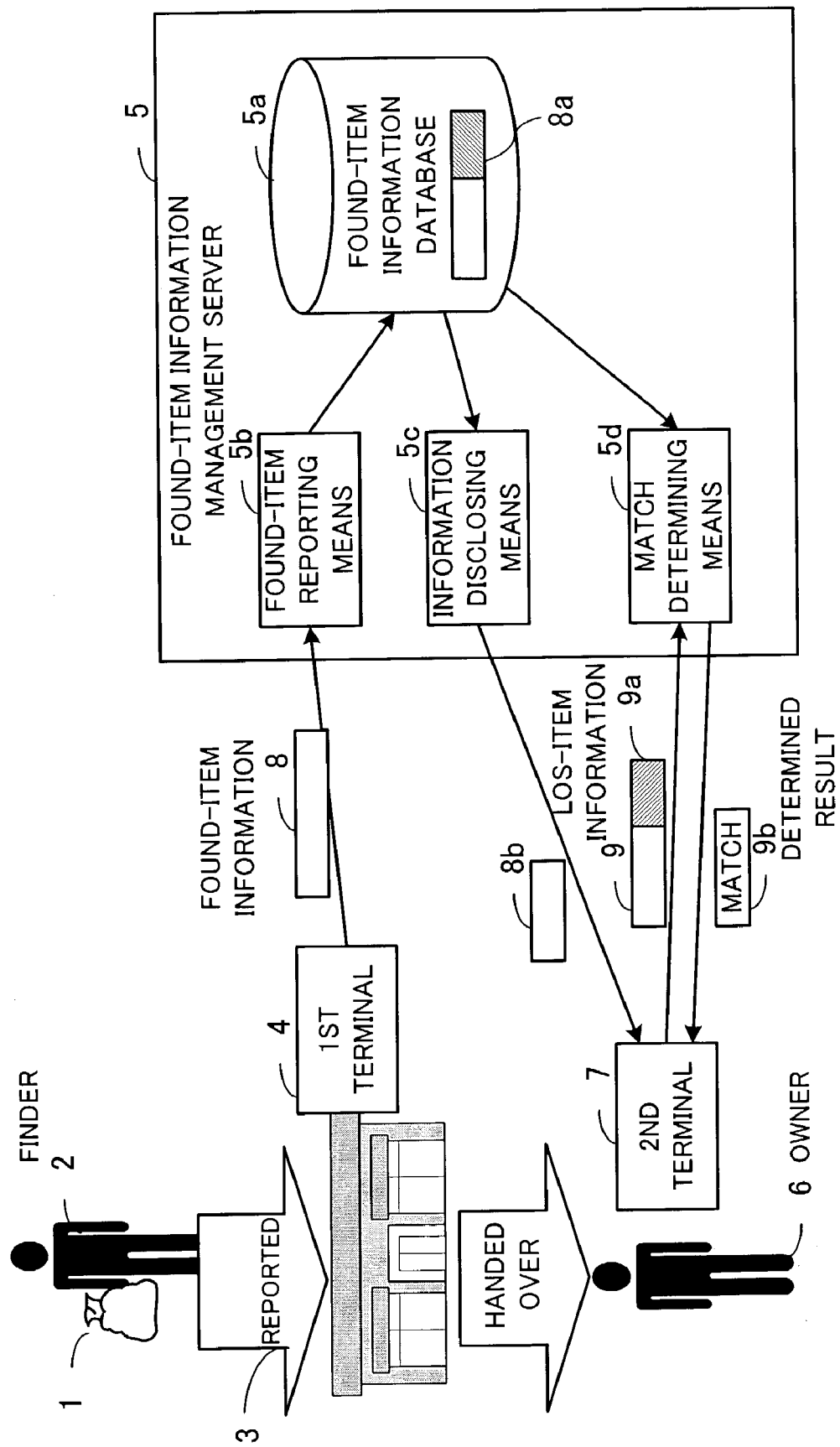
FIG. 1 is a block diagram showing the concept of an embodiment of the present invention.

FIG. 1 shows in block form the concept of the embodiment of the present invention. In FIG. 1, a found-item information management server 5 manages information about found items. The found-item information management server 5 has a found-item reporting means 5b for accepting found-item information 8 about a found item which is entered from a first terminal 4 via a network, and registering the found-item information 8, partly as secret particular information 8a, in a found-item information database 5a. The found-item information management server 5 also has an information disclosing means 5c for sending the found-item information 8 registered in the found-item information database 5a, except for the particular information 8a, to a second terminal 7 in response to a request, which is entered from the second terminal 7 via the network, to refer to the found-item information 8. The found-item information management server 5 further includes a match determining means 5d for accepting lost-item information 9 about a lost item which is entered from the second terminal 7 via the network, determining a match between the lost-item information 9 and the particular information 8a stored in the found-item information database 5a, and sending a determined result 9b to the second terminal 7.

Since the found-item information management server 5 is connected to the first terminal 4 and the second terminal 7 via the network via the network, a found item can be reported from the first terminal 4 through the network and a report on a found item can be confirmed at the second terminal 7 through the network.

For example, a finder 2 which has picked up a found item 1 reports the found item 1 to a nearby shop 3, and sends found-item information 8 from the first terminal 4 placed in the shop 3 to the found-item information management server 5 via the network.

In the found-item information management server 5, the found-item reporting means 5b accepts the found-item information 8 which is entered from the first terminal 4 via the network. The found-item reporting means 5b registers the found-item information 8, partly as secret particular information 8a, in the found-item information database 5a.

An owner 6 who has lost an item sends a request to refer to the found-item information 8 from the second terminal 7 via the network to the found-item information management server 5. In the found-item information management server 5, the information disclosing means 5c sends information 8b of the found-item information 8 registered in the found-item information database 5a, except for the particular information 8a, to the second terminal 7.

The owner 6 refers to the received information 8b using the second terminal 7. If the contents of the information 8b match the lost item, then the owner 6 sends lost-item information 9 (including at least particular information) from the second terminal 7 via the network to the found-item information management server 5. In the found-item information management server 5, the match determining means 5d determines a match between the lost-item information 9 and the particular information 8a stored in the found-item information database 5a. For example, the match determining means 5d extracts information 9a of the lost-item information 9, which corresponds to the particular information 8a of the found-item information 8, and determines a match between the particular information 8a and the extracted information 9a. The match determining means 5d then sends a determined result 9b to the second terminal 7.

If the determined result 9b received by the second terminal 7 represents a match between the particular information 8a and the extracted information 9a, then the owner 6 goes to the shop 3, and retrieves the lost item which has been reported as the found item 1 to the shop 3.

As described above, part of the found-item information 8 is registered as secret particular information 8a, and a match between the secret particular information 8a and the lost-item information 9 is determined. Therefore, it can be confirmed that the owner 6 is the lawful owner of the found-item 1, i.e., owner masquerading is prevented. As a result, the found-item information 8 except the particular information 8a can be disclosed on a wide area network, and hence can be referred to on a computer which is located at the home of the owner 6, for example.

Since the found-item information 8 is sent to the found-item information management server 5 via a wide area network, it can easily be sent from the shop 3 near the location where the lost item is found to the found-item information management server 5. Consequently, the burden imposed on the finder 2 for reporting the found item 1 is reduced, the percentage of found items that are reported is increased, and found items are reported quickly. As a result, the lost item is handed over to the owner 2 early with a high probability.

An advertisement of the shop 3 which stores the found item 1 may be sent to the second terminal 7 in response to a request to refer to the found-item information 8. The shop 3 with its advertisement thus sent to the second terminal 7 can expect itself to be advertised on the second terminal 7 by storing the found item 1. Accordingly, the shop 3 is commercially motivated to accept and keep found items. A system for adding an advertisement to found-item information and sending the found-item information with the added advertisement to the owner will be described below as a specific example of the embodiment.

Figure 2:
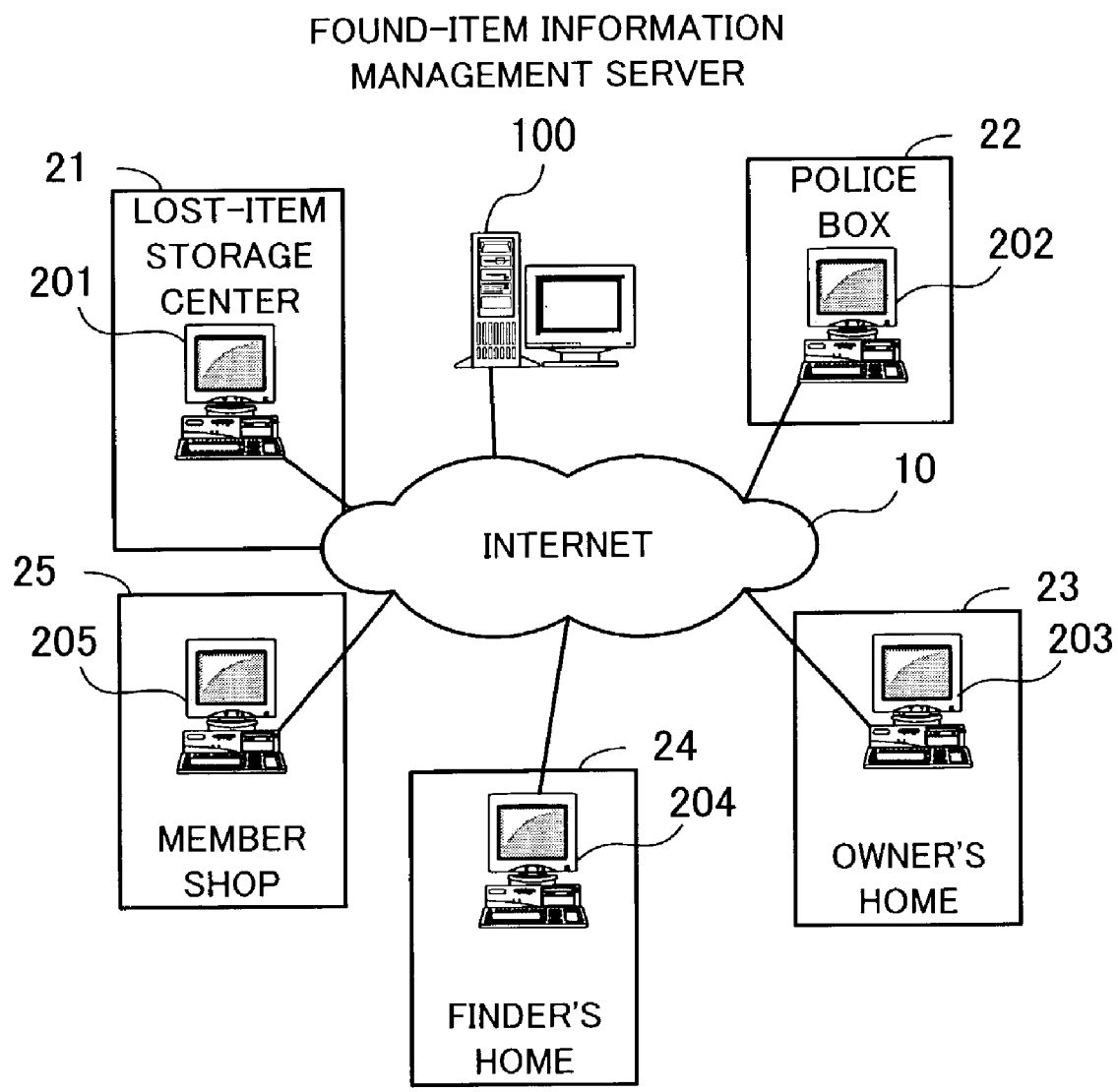
FIG. 2 is a block diagram of a system according to the embodiment of the present invention.

FIG. 2 shown in block form a system according to the embodiment of the present invention. As shown in FIG. 2, a plurality of terminals 201 through 205 are connected to a found-item information management server 100 through the Internet 10. The terminals 201 through 205 are devices for entering and browsing information about lost items and found items.

The terminal 201 is placed in a lost-item storage center 21, for example. The lost-item storage center 21 is a facility for storing and managing items which have been reported in its jurisdiction. The lost-item storage center 21 keeps found items, confirms legal ownership of found items by owners, and hands over found items to their owners. The lost-item storage center 21 may also keep a remuneration (reward) offered by the owner to the finder. When a found item is handed over to the owner at the lost-item storage center 21, an input representing the completion of the delivery of the found item to the owner is entered into the terminal 201. The input is then sent to and managed by the found-item information management server 100.

The terminal 202 is placed in a police box 22. The police box 22 accepts a report on a found item. When the found item is reported, information about the found item is entered into the terminal 202. The entered found-item information is sent from the terminal 202 to the found-item information management server 100 and managed thereby. When the found-item information is entered into the terminal 202, a printer connected to the terminal 202 outputs a "found-item deposit receipt". Thereafter, the police box 22 keeps the found item for a predetermined period of time. If the owner of the found item shows up within the predetermined period of time, then the found item is handed over to the owner. If not, then the found item is sent to the lost-item storage center 21.

The terminal 203 is placed in an owner's home 23. The owner who has lost an item can make the following actions on the terminal 203:

Reporting the Lost Item:

The owner enters information about the lost item into the terminal 203. At this time, the owner may attach image data of the lost item to the information. The entered lost-item information is sent from the terminal 203 to the found-item information management server 100, where it is managed. A printer connected to the terminal 203 prints a "lost-item report".

Found-Item Search:

A found-item search process can be carried out immediately or at any desired time after the owner has filed a lost-item report. In the found-item search process, the owner uses the terminal 203 to instruct the found-item information management server 100 to search for the found-item information which matches the contents of the lost-item report. The found-item information management server 100 then notifies the terminal 203 of a search result. The search result is in the form of a list of found-item information which is similar to the entered lost-item information. The owner specifies the found-item information which is believed to represent the lost item of the owner, and operates the terminal 203 to answer questions sent from the found-item information management server 100. Based on the answers, the found-item information management server 100 determines whether the found-item information and the lost-item information match each other or not, and then sends a decision to the terminal 203.

Receiving a Match Notification:

If the found-item information registered by the finder and the lost-item information registered by the owner are compared and determined as matching each other by the found-item information management server 100, then a matching notification is sent from the found-item information management server 100 to the terminal 203. The matching notification is sent as e-mail, for example.

If the owner receives a decision indicative of a match or a matching notification from the found-item information management server 100, then the owner goes to the place where the found item is kept, carrying the "lost-item report". The owner receives the lost item and pays a remuneration (reward).

The terminal 204 is placed in a finder's home 24. The finder who has found an item can make the following actions on the terminal 204:

Reporting the Found Item:

The finder uses the terminal 204 to access the found-item information management server 100 and reports a found item. Specifically, the finder enters information about the found item into the terminal 204. At this time, the finder may attach image data of the found item to the information. The entered found-item information is sent from the terminal 204 to the found-item information management server 100, where it is managed. A printer connected to the terminal 204 prints a "found-item report".

The finder carries the found item and the found-item report to a nearby police box or the like, and receives a "found-item deposit receipt".

Lost-Item Search:

A lost-item search process can be carried out immediately or at any desired time after the finder has filed a found-item report. In the lost-item search process, the finder uses the terminal 204 to instruct the found-item information management server 100 to search for the lost-item information which matches the contents of the found-item report. The found-item information management server 100 then notifies the terminal 204 of a search result. The search result is in the form of a list of lost-item information which is similar to the entered found-item information. The finder specifies the lost-item information which is believed to represent the found item picked up by the finder, and operates the terminal 204 to answer questions sent from the found-item information management server 100. Based on the answers, the found-item information management server 100 determines whether the lost-item information and the found-item information match each other or not, and then sends a decision to the terminal 204.

Receiving a Claiming Notification:

When the owner has showed up or 6 months have elapsed, the found-item information management server 100 sends a notification for the finder to claim a remuneration (reward) or the found item. After confirming the claiming notification, the finder carries the "found-item deposit receipt" to an indicated place, such as the lost-item storage center 21, and receives a remuneration (reward) or the found item.

The terminal 205 is placed in a member shop 25 which belongs to a group for providing a service to temporarily keep lost items. When a finder reports the found item to the member shop 25, the member shop 25 can report the found item by using the terminal 205. The member shop 25 temporarily keeps the found item, and when the owner shows up, the member shop 25 hands the found item over to the owner in exchange for a remuneration (reward).

The above system ensures that a found item will be handed over to the lawful owner. The system shown in FIG. 2 is constructed around the found-item information management server 100, which may comprise a server computer that can be connected to a network.

Figure 3:
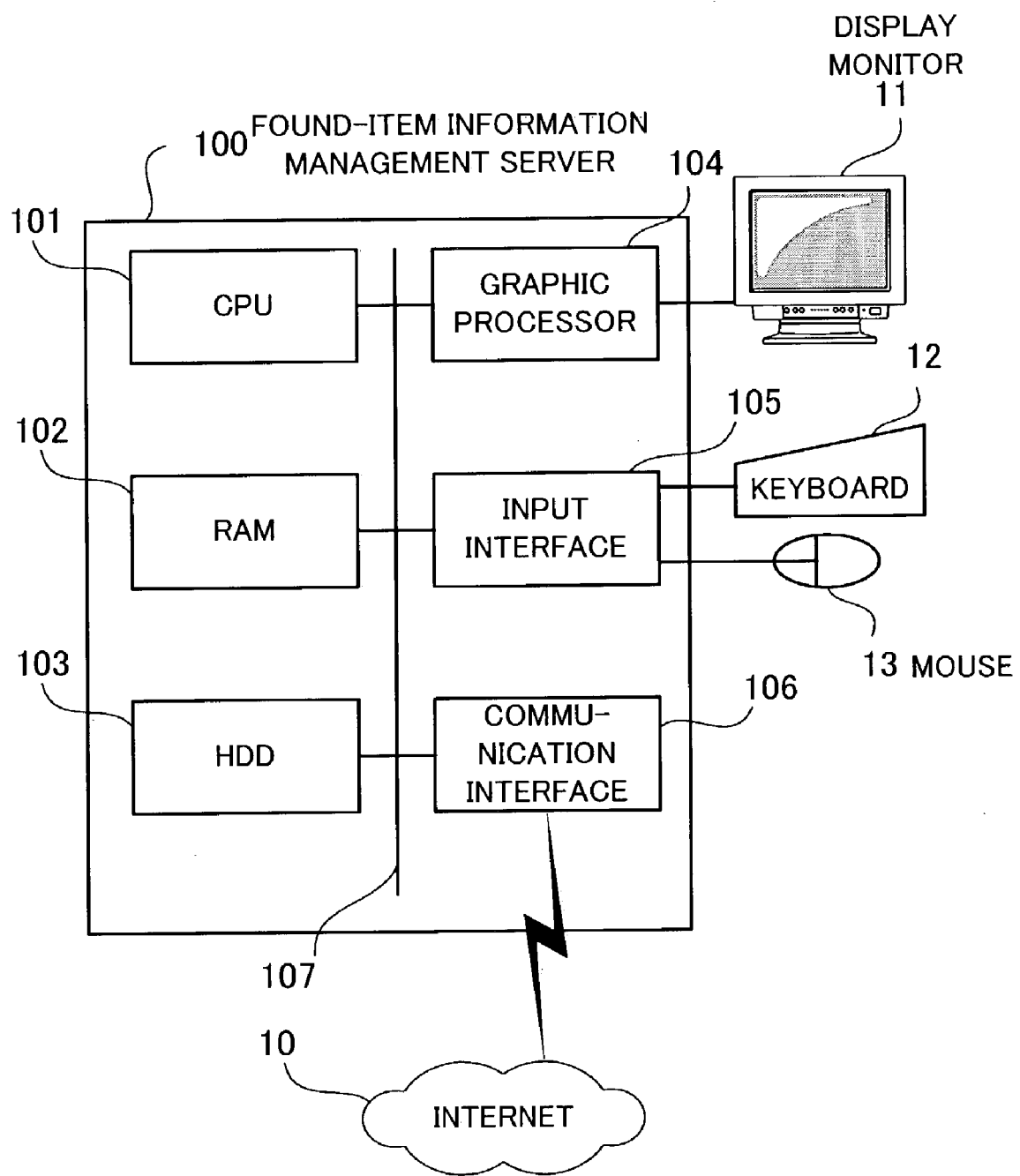
FIG. 3 is a block diagram of a hardware arrangement of a found-item information management server.

FIG. 3 shows in block diagram a hardware arrangement of the found-item information management server 100. The found-item information management server 100 is controlled in its entirety by a CPU (Central Processing Unit) 101. To the CPU 101, there are connected a RAM (Random Access Memory) 102, a HDD (Hard Disk Drive) 103, a graphic processor 104, an input interface 105, and a communication interface 106 through a bus 107.

The RAM 102 temporarily stores at least a portion of an OS (Operating System) and application programs which are to be executed by the CPU 101. The RAM 102 also stores various data required for the processing carried out by the CPU 101. The HDD stores the OS and the application programs.

A display monitor 11 is connected to the graphic processor 104. The graphic processor 104 displays images on the display screen of the display monitor 11 according to instructions from the CPU 101. A keyboard 12 and a mouse 13 are connected to the input interface 105. The input interface 105 sends signals from the keyboard 12 and the mouse 13 to the CPU 101 via the bus 107.

The communication interface 106 is connected to the Internet 10. The communication interface 106 sends data to and receive data from other computers via the Internet 10.

The hardware arrangement shown in FIG. 3 performs the processing functions according to the embodiment of the present invention. While FIG. 3 shows only the hardware arrangement of the found-item information management server 100, each of the terminals 201 through 205 may be of a hardware arrangement similar to the hardware arrangement shown in FIG. 3. Image data input/output devices such as a printer, a scanner, a digital camera, etc. can be connected to each of the terminals 201 through 205.

Figure 4:
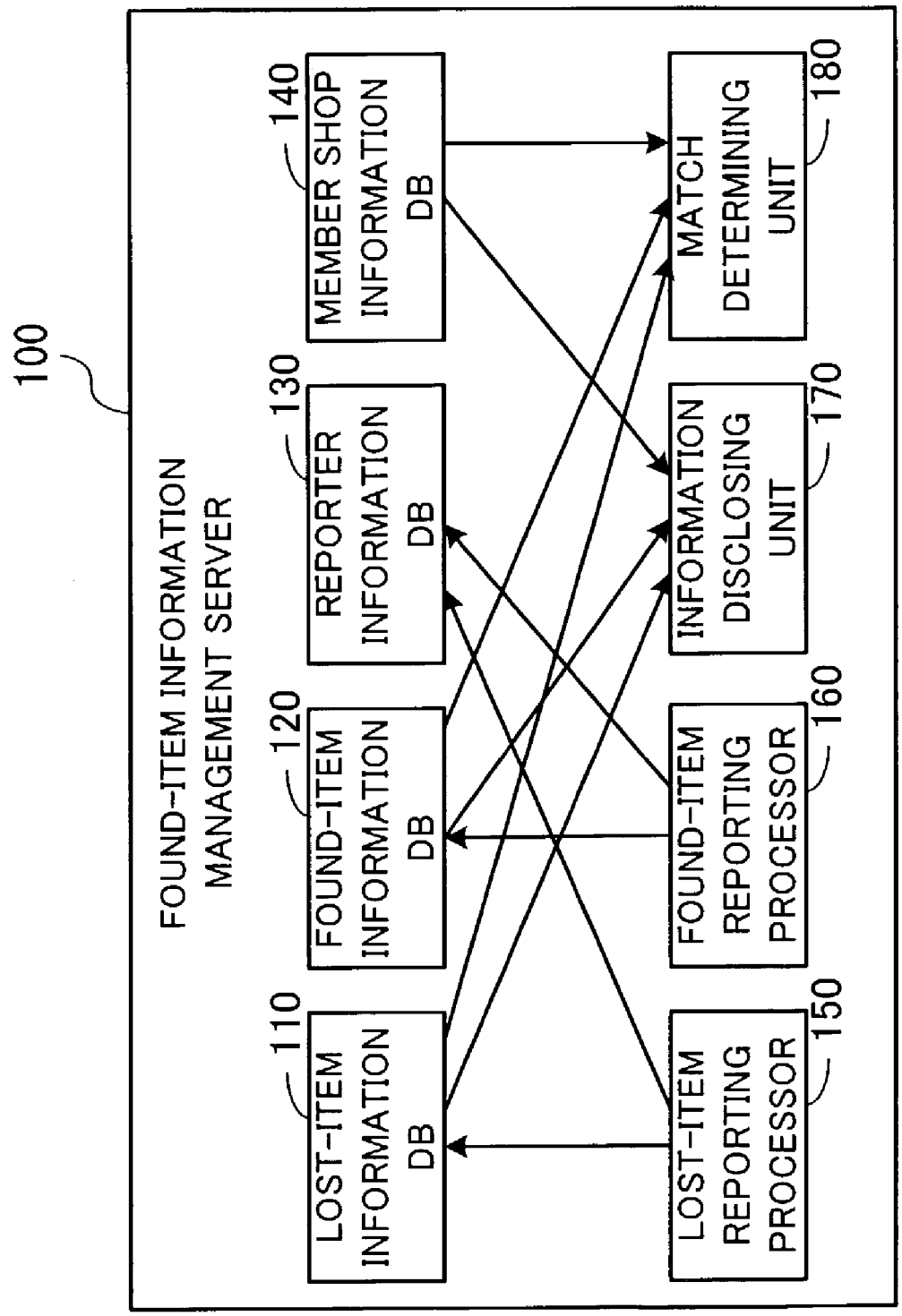
FIG. 4 is a block diagram of functions of the found-item information management server.

FIG. 4 shows in block diagram the functions of the found-item information management server 100. As shown in FIG. 4, the found-item information management server 100 has a lost-item information database (DB) 110, a found-item information database (DB) 120, a reporter information database (DB) 130, a member shop information database (DB) 140, a lost-item reporting processor 150, a found-item reporting processor 160, an information disclosing unit 170, and a match determining unit 180.

The lost-item information DB 110 is a database of registered information about lost items which has been entered by owners who have lost items. The found-item information DB 120 is a database of registered information about found items which has been entered by finders who have found lost items (found items). The reporter information DB 130 is a database of registered information about owners and finders which has been entered by owners and finders themselves. The member shop information DB 140 is a database of registered information about member shops which have accepted a temporary deposit of found items.

The lost-item reporting processor 150 receives a report of a lost item which has been made from the owner through the terminal. The lost-item reporting processor 150 registers information about a reported lost item in the lost-item information DB 110. The lost-item reporting processor 150 also registers information about the owner who has reported a lost item in the reporter information DB 130. Furthermore, if the lost-item reporting processor 150 receives information indicating that a lost item has been found and handed over to the owner, then the lost-item reporting processor 150 sets that information in the corresponding lost-item information in the lost-item information DB 110.

The found-item reporting processor 160 receives a report of a found item which has been made from the finder through the terminal. The found-item reporting processor 160 registers information about a reported found item in the found-item information DB 120. The found-item reporting processor 160 also registers information about the finder who has reported a found item in the reporter information DB 130. Furthermore, if the found-item reporting processor 160 receives information indicating that the owner has been found and the found item has been handed over to the owner, then the found-item reporting processor 160 sets that information in the corresponding found-item information in the found-item information DB 120.

The information disclosing unit 170 provides contents of the lost-item information DB 110 and the found-item information DB 120 to terminals connected to the Internet 10.

The match determining unit 180 retrieves information registered in the lost-item information DB 110 and the found-item information DB 120, and compares contents of the detected information to detect similar information and determine a match between the compared contents. The match determining unit 180 retrieves information and compares contents of the detected information in response to requests made from the owner and the finder through the terminals 203, 204.

When the match determining unit 180 is supplied with found-item information, it checks a match between the supplied found-item information and the lost-item information registered in the lost-item information DB 110. If lost-item information is detected which matches the supplied found-item information, then the match determining unit 180 indicates the match to the owner who has made the lost-item report. For example, the match determining unit 180 indicates the match by way of e-mail. The owner can thus immediately known that its own lost item has been reported as a found item without having been monitoring the found-item information DB 120.

The match determining unit 180 extracts, from the found-item information registered in the found-item information DB 120, found-item information representing a found item whose owner has not showed up upon elapse of a predetermined period of time (e.g., 6 months) after which the finder will obtain ownership of the found item. Then, the match determining unit 180 notifies the finder who has reported the found item whose information has been extracted that the predetermined period of time has elapsed, by way of e-mail. Thus, the finder is aware that it will obtain ownership of the found item.

FIG. 5 is a diagram showing a data structure of the lost-item information DB 110. The lost-item information DB 110 has a column of reference numbers (No.), a column of lost-item names, a column of feature information (open to the public), a column of particular information (can be open to the public if marked with *), a column of date and time information, a column of location information, a column of reporters, a column of found-item hand-over details, and a column of found-item matching notifications.

The column of reference numbers (No.) is used to set therein reference numbers of respective reports of lost items.

The column of lost-item names is used to set therein the general names of lost items, e.g., bag and wallet.

The columns of feature information (open to the public) is used to set therein registered information representing features of lost items. The feature information is information which is open to the public. The column of feature information is subdivided into a plurality of columns of attributes representing features of lost items. In FIG. 5, these attributes are colors, kinds, and images of lost items. Specifically, the column of colors is used to set therein the colors of the appearances of found items. The column of kinds is used to set therein information about the kinds of found items. For example, if a found item is a bag, then the column of kinds is used to set therein information indicating that the bag is a second bag (second), and if a found item is a wallet, then the column of kinds is used to set therein information indicating that the wallet is double-folded. The column of images is used to set therein the names of files which save images of found items.

The column of particular information (which is open to the public if marked with a star) is used to set therein registered information which identifies a lost item depending on an input from the owner. The particular information is open to the public only when it is information specified by the owner, and is kept secret otherwise. In FIG. 5, the information specified as capable of being open to the public is marked with a star (*). The column of particular information is subdivided into a plurality of items (particular 1, particular 2, particular 3) for registering information required to identify lost items.

The column of date and time information is used to set therein information about dates and times when items have been lost (in a column of lost dates and times) and information about dates and times when lost items have been reported (in a column of reported dates and times). The dates and times when items have been lost represent dates and times that are entered by owners who have lost items. The dates and times when lost items have been reported represent dates and times when reports on lost items are processed as indicated by time stamps in found-item information management server 100.

The column of location information is used to set therein information about locations where items have been lost (in a column of lost locations) and information about locations where lost items have been reported (in a column of reported locations). The locations where items have been lost refer to as specific locations as possible, e.g., "near Sendai station". A location where a lost item has been reported refers to the name of a police box, for example, if the lost item has been reported to the police box. If the owner of a lost item has reported the lost item by using the terminal 203 at the owner's home 23, then "system" is set in the location where the lost item has been reported.

The column of reporters is used to set therein the identification numbers of owners who have reported lost items.

The column of found-item hand-over details is used to set therein the identification numbers (in a column of No.) of finder information registered by finders, dates and times when found items have been handed over to the owners (in a column of dates and times), and remunerations if found items have been handed over to the owners.

The column of found-item matching notifications is used to set therein the identification numbers (in a column of No.) of found-object information which has matched lost-item information and dates and times when found-object information has matched lost-item information.

FIG. 6 is a diagram showing a data structure of the found-item information DB 120. The found-item information DB 120 has a column of reference numbers (No.), a column of found-item names, a column of feature information (open to the public), a column of particular information (secret), a column of date and time information, a column of location information, a column of reporters, a column of storage locations, a column of hand-over-to-owner details, and a column of dates and times when reporters have been notified.

The column of reference numbers (No.) is used to set therein reference numbers of respective reports of found items.

The column of found-item names is used to set therein the general names of found items, e.g., bag and wallet.

The columns of feature information (open to the public) is used to set therein registered information representing features of found items. The feature information is information which is open to the public. The column of feature information is subdivided into a plurality of columns of attributes representing features of found items. In FIG. 6, these attributes represent colors, kinds, and images of found items. Contents of these columns are the same as those of the columns of feature information in the lost-item information DB 110 shown in FIG. 5.

The column of particular information (not open to the public) is used to set therein registered information which identifies a found item depending on an input from the owner. The particular information is not open to the public, i.e., is kept secret. The column of particular information (not open to the public) is subdivided into a plurality of items (particular 1, particular 2, particular 3) for registering information required to identify found items. The particular information may represent contents of bags and wallets, for example. Contents of bags may include cigarettes, lighters, keys, etc., and contents of wallets may include amounts of money, cash card, etc.

The column of date and time information is used to set therein information about dates and times when items have been found (in a column of found dates and times) and information about dates and times when found items have been reported (in a column of reported dates and times). The dates and times when items have been found represent dates and times that are entered by finders who have found lost items. The dates and times when found items have been reported represent dates and times when reports on found items are processed as indicated by time stamps in found-item information management server 100.

The column of location information is used to set therein information about locations where items have been found (in a column of found locations) and information about locations where found items have been reported (in a column of reported locations). The locations where items have been found refer to as specific locations as possible, e.g., "before Department Store XX on Aoba street". A location where a found item has been reported refers to the name of a police box, for example, if the found item has been reported to the police box. If the finder of a found item has reported the found item by using the terminal 204 at the founder's home 24, then "system" is set in the location where the found item has been reported.

The column of reporters is used to set therein the identification numbers of finders who have reported found items.

The column of storage locations is used to set therein information about present locations where found items are stored. If a found item is stored in a police box, then the found item is kept stored in the police box for a predetermined period of time, and thereafter stored in the lost-item storage center 21. If the finder of a found item has reported the found item using the terminal 204 at the finder's home 24, then "finder" is set as the storage location until the finder submits the found item to a public organization such as a police box or the like.

The column of hand-over-to-owner details is used to set therein the identification numbers (in a column of No.) of owner information registered by owners, and dates and times when found items have been handed over to the owners (in a column of dates and times), if found items have been handed over to the owners.

The column of dates and times when reporters have been notified is used to set therein dates and times when reporters (finders) are notified of the hand-over of found items to the owners. The notification is sent as email, for example, to reporters.

FIG. 7 shows a data structure of the reporter information DB 130. The reporter information DB 130 has a column of identification numbers (No.) of reporters, a column of names of reporters, a column of telephone numbers of reporters, a column of e-mail addresses of reporters, a column of addresses of reporters, a column of map information, and a column of PR (Public Relations) information of reporters.

The column of identification numbers (No.) of reporters is used to set therein the identification numbers of reporters (including reporters of found items and reporters of lost items).

The column of names of reporters contain the names of reporters. If a reporter is a corporate body or a private store, then the name of the corporate body or the private store is set in the column.

The column of telephone numbers of reporters is used to set therein the telephone numbers of reporters.

The column of e-mail addresses of reporters is used to set therein the e-mail addresses of reporters.

The column of addresses of reporters is used to set therein the addresses of reporters.

The column of map information is used to set therein the names of image data representing maps of routes up to the locations of reporters;

The column of PR information is used to set therein PR information of reporters. Specifically, PR characters or the names of image data of banner advertisements may be set in the column of PR information.

FIG. 8 shows a data structure of the member shop information DB 140. The member shop information DB 140 has a column of identification numbers (No.) of member shops, a column of names of member shops, a column of addresses of member shops, a column of telephone numbers of member shops, a column of e-mail addresses of member shops, a column of banner advertisements, a column of one-point PR, a column of merchandise coupon information, a column of found-item information.

The column of identification numbers (No.) of member shops is used to set therein the identification numbers of member shops.

The column of names of member shops is used to set therein the names of member shops.

The column of addresses of member shops is used to set therein the addresses of member shops.

The column of telephone numbers of member shops is used to set therein the telephone numbers of member shops.

The column of e-mail addresses of member shops is used to set therein the e-mail addresses of member shops.

The column of banner advertisements is used to set therein the names of image data of banner advertisements for introducing member shops or goods and services provided by member shops.

The column of one-point PR is used to set therein messages for introducing member shops or goods and services provided by member shops.

The column of merchandise coupon information is used to set therein information about merchandise coupons issued by member shops. The information about merchandise coupons may represent the number of issued merchandise coupons, how issued merchandise coupons have been used, and the number of merchandise coupons available in stock.

The column of found-item information is used to set therein information about found items stored in member shops.

The found-item information management server 100 with the above databases manages information about lost items and found items.

A process of reporting a lost item and a process of reporting a found item will be described in specific detail below.

Figure 9:
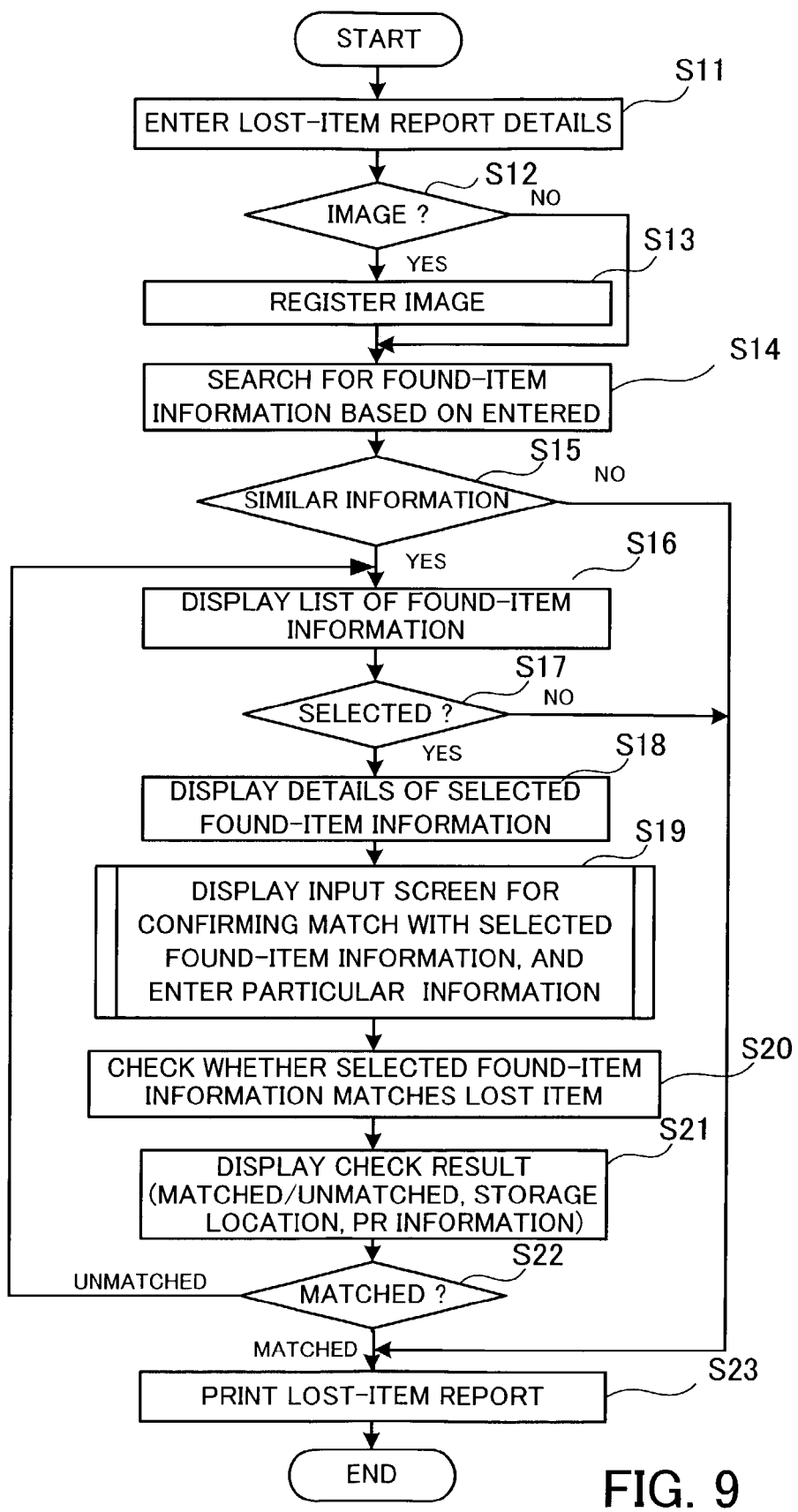
FIG. 9 is a flowchart of a process of reporting a lost item.

FIG. 9 is a flowchart of a process of reporting a lost item. The process of reporting a lost item will be described below according to step numbers shown in FIG. 9.

[Step S11]

The owner of a lost item enters lost-item report details using the terminal 203. The entered lost-item report details are sent to the found-item information management server 100, and stored in the lost-item information DB 110 by the lost-item reporting processor 150.

[Step S12]

The owner determines whether there is an image of the lost item or not. If there is an image of the lost item, then process goes to step S13. If there is no image of the lost item, then process goes to step S14.

[Step S13]

The owner sends the image data to the found-item information management server 100 by using the terminal 203. The image of the lost item is stored in the found-item information management server 100, and the name of the image data is set in the column of images in the column of feature information (open to the public) in the lost-item information DB 110 by the lost-item reporting processor 150.

[Step S14]

The owner enters a request to search for found-item information based on the details entered in step S11 into the terminal 203. The terminal 203 sends the retrieval request to the found-item information management server 100, in which the match determining unit 180 searches the found-item information DB 120.

[Step S15]

The match determining unit 180 determines whether there is similar found-item information or not. If there is similar found-item information, then process goes to step S16. If there is no similar found-item information, then process goes to step S23.

[Step S16]

The match determining unit 180 sends information about a list of similar found-item information to the terminal 203. The terminal 203 displays the list of similar found-item information on its display monitor.

[Step S17]

The owner refers to the list of similar found-item information displayed by the terminal 203, and selects, if any, found-item information which appears to correspond to the owner's lost item, by using the terminal 203. If the owner selects found-item information, process goes to step S18. If the owner selects no found-item information, process goes to step S23.

[Step S18]

The terminal 203 requests the found-item information management server 100 to send details of the found-item information selected by the owner. The information disclosing unit 170 of the found-item information management server 100 reads the details (which can be open to the public) of the selected found-item information from the found-item information DB 120, and sends the read details to the terminal 203. The terminal 203 displays the details of the selected found-item information on its display monitor.

[Step S19]

The terminal 203 displays an input screen for the owner to confirm a match between the selected found-item information and the lost item of the owner. On the displayed input screen, the owner then enters particular information into the terminal 203. A process of entering particular information will be described later on.

[Step S20]

The particular information which has been entered into the terminal 203 is sent from the terminal 203 to the found-item information management server 100. The match determining unit 180 checks whether the selected found-item information matches the lost item of the owner who operates the terminal 203, based on the particular information sent from the terminal 203.

[Step S21]

The match determining unit 180 sends the result of the matching check to the terminal 203, which displays the result of the matching check. The displayed result includes information indicating whether the selected found-item information matches the lost item or not, a storage location if the selected found-item information matches the lost item, and the PR information of a member shop if the member shop serves as the storage location.

[Step S22]

The terminal 203 determines from the result of the matching check whether the selected found-item information matches the lost item or not. If the selected found-item information matches the lost item, then process goes to step S23. If the selected found-item information does not match the lost item, then process goes back to step S16.

[Step S23]

The terminal 203 prints a lost-item report on its printer.

In this manner, the lost item is reported by using the terminal 203.

A process of entering particular information in step S19 will be described below.

Figure 10:
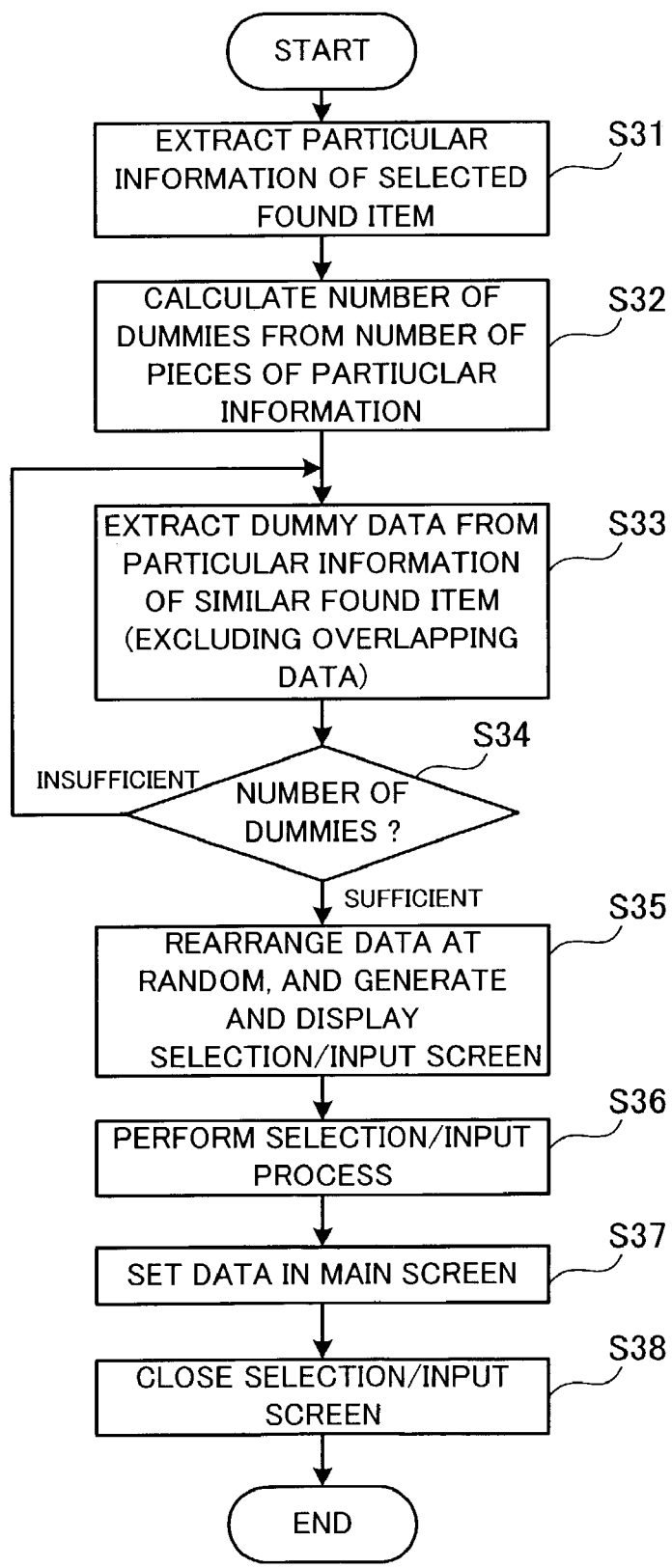
FIG. 10 is a flowchart of a detailed process of entering particular information.

FIG. 10 is a flowchart of a detailed process of entering particular information. The process of entering particular information will be described below according to step numbers shown in FIG. 10.

[Step S31]

The terminal 203 sends a request to obtain dummy information as to the selected found-item information to the found-item information management server 100. The match determining unit 180 extracts particular information of the selected found item from the found-item information DB 120.

[Step S32]

The match determining unit 180 calculates the number of dummies from the number of pieces of particular information.

[Step S33]

The match determining unit 180 extracts dummy data from the particular information of a similar found item. At this time, the match determining unit 180 excludes overlapping data.

[Step S34]

The match determining unit 180 determines whether the number of dummy data is sufficient or not by determining whether the number of dummy data is greater than the number of dummies calculated in step S32 or not. If the number of dummy data is sufficient, then process goes to step S35. if the number of dummy data is insufficient, then process goes back to step S33 in which the match determining unit 180 extracts dummy data from the particular information of another similar found item.

[Step S35]

The match determining unit 180 randomly rearranges the dummy data and the data of the selected found item, thus generating selection/input screen data. The match determining unit 180 sends the generated selection/input screen data to the terminal 203, which displays a selection/input screen on its display monitor.

[Step S36]

The terminal 203 accepts an action to select and enter particular information from the owner.

[Step S37]

The terminal 203 sets the selected and entered particular information in a main screen, which is a displayed found-item information and confirmatory matter input screen 60 shown in FIG. 14.

[Step S38]

The terminal 203 closes the selection/input screen. Thereafter, process goes to step S20.

The above process allows the owner to report the lost-item and to search for the lost item from the found-item information which has already been reported. Screens which are displayed on the terminal 203 when a lost item is reported by using the terminal 203 will be described below.

When the owner of a lost item accesses the found-item information management server 100 from the terminal 203 in order to report the lost item, the terminal 203 displays a lost-item reporting screen.

FIG. 11 shows an example of a lost-item reporting screen 30. The lost-item reporting screen 30 includes a reporter information display area 31, a lost date and time input area 32, a lost location input area 33, a lost-item name input area 34, a feature information input area 35, an image registration area 36, a particular information input area 37, and a disclosure permission/inhibition flag input area 38.

The reporter information display area 31 displays the identification number and name of a reporting owner. In the example shown in FIG. 11, the reporter information display area 31 displays an identification number "CXX105" and a name "SASAKI KAZUO".

The lost date and time input area 32 is a text box for entering a date and time when the owner has lost an item. In the example shown in FIG. 11, the date Mar. 1, 2002 and the time "17 hours 00 minutes (02.03.01 17:00) are entered in the lost date and time input area 32.

The lost location input area 33 is a text box for entering a location where the owner has lost an item. In the example shown in FIG. 11, "AOBA STREET" is entered in the lost location input area 33.

The lost-item name input area 34 is a text box for entering the name of a lost item. In the example shown in FIG. 11, "BAG" is entered in the lost-item name input area 34.

The feature information input area 35 is a text box for entering features of a lost item. In the feature information input area 35, features such as attributes including a color, a kind, etc. can be entered. In the example shown in FIG. 11, the color "BLACK" and the kind "SECOND BAG" are entered in the feature information input area 35.

The image registration area 36 is a setting area for registering the image data of a lost item.

The particular information input area 37 is a text box for entering the particular information of a lost item. The particular information is set as a combination of the kind and content of the information. In the example shown in FIG. 11, the kind "content" and the content "key" are set in the particular information input area 37. Each piece of the particular information is associated with the disclosure permission flag input area 38. The disclosure permission/inhibition flag input area 38 is a check box for setting the value of a flag (disclosure permission/inhibition flag) indicative of whether the corresponding particular information can be made open to the public or not. If the disclosure permission/inhibition flag input area 38 is selected (with a check mark displayed), then the disclosure permission/inhibition flag is set to permit the particular information to be open to the public or not.

Each of the lost-item name input area 34, the feature information input area 35, and the particular information input area 37 has a button (indicated by a triangle) for opening a pull-down menu. When the button is clicked, a list of data that can be entered is displayed as a pull-down menu. The owner can enter necessary matters into each of the lost-item name input area 34, the feature information input area 35, and the particular information input area 37 by selecting corresponding data from the pull-down menu.

When necessary data are entered in the lost-item reporting screen 30, the entered data are sent to the found-item information management server 100. The found-item information management server 100 then searches for lost-item information similar to the entered data. When similar found items are detected by the search, the found-item information management server 100 sends the similar found items to the terminal 203. The terminal 203 then displays a screen showing a list of similar found items on its display monitor. If there is no similar found-item information, then the terminal 203 closes the lost-item reporting screen 30, and prints a lost-item report.

FIG. 12 shows a similar found-item list screen 40 by way of example. As shown in FIG. 12, the similar found-item list screen 40 has a similar lost-item display area 41 and an end button 42.

The similar lost-item display area 41 displays identification numbers (No.), features, lost locations, and images of lost items. The similar lost-item display area 41 contains selection areas 41a associated with respective pieces of lost-item information. Each of the selection areas 41a is a check box for selecting the displayed found-item information to be determined if it matches particular information or not. If a selection area 41a is selected ((with a check mark displayed), then it is determined whether the corresponding found-item information matches particular information or not.

The end button 42 is a button for closing the similar found-item list screen 40. If there is a selected found-item information at the time the end button 42 is clicked, then the similar found-item list screen 40 changes to a selection/input screen for selecting and inputting the found-item information. If there is no selected found-item information at the time the end button 42 is clicked, then the similar found-item list screen 40 is closed, and a lost-item report is printed.

When the similar found-item list screen 40 is displayed, the owner selects found-item information which possibly represents the lost item of the owner. In FIG. 12, for example, a plurality of bags are detected as similar found items, and one of the bags (reference number "AXX001") has been found "before Department Store XX on Aoba street" and the other bag (reference number "AXX003") has been found at "the crossing XX on Aoba Street". If the owner has walked "before Department Store XX", but not across "the crossing XX" on the day the owner has lost the item, then it is more likely for the bag under the reference number "AXX001" to be the lost item of the owner. The owner, therefore, selects the found-item information of the reference number "AXX001", and clicks the end button 42. The terminal 203 now displays a selection/input screen.

Figure 13:
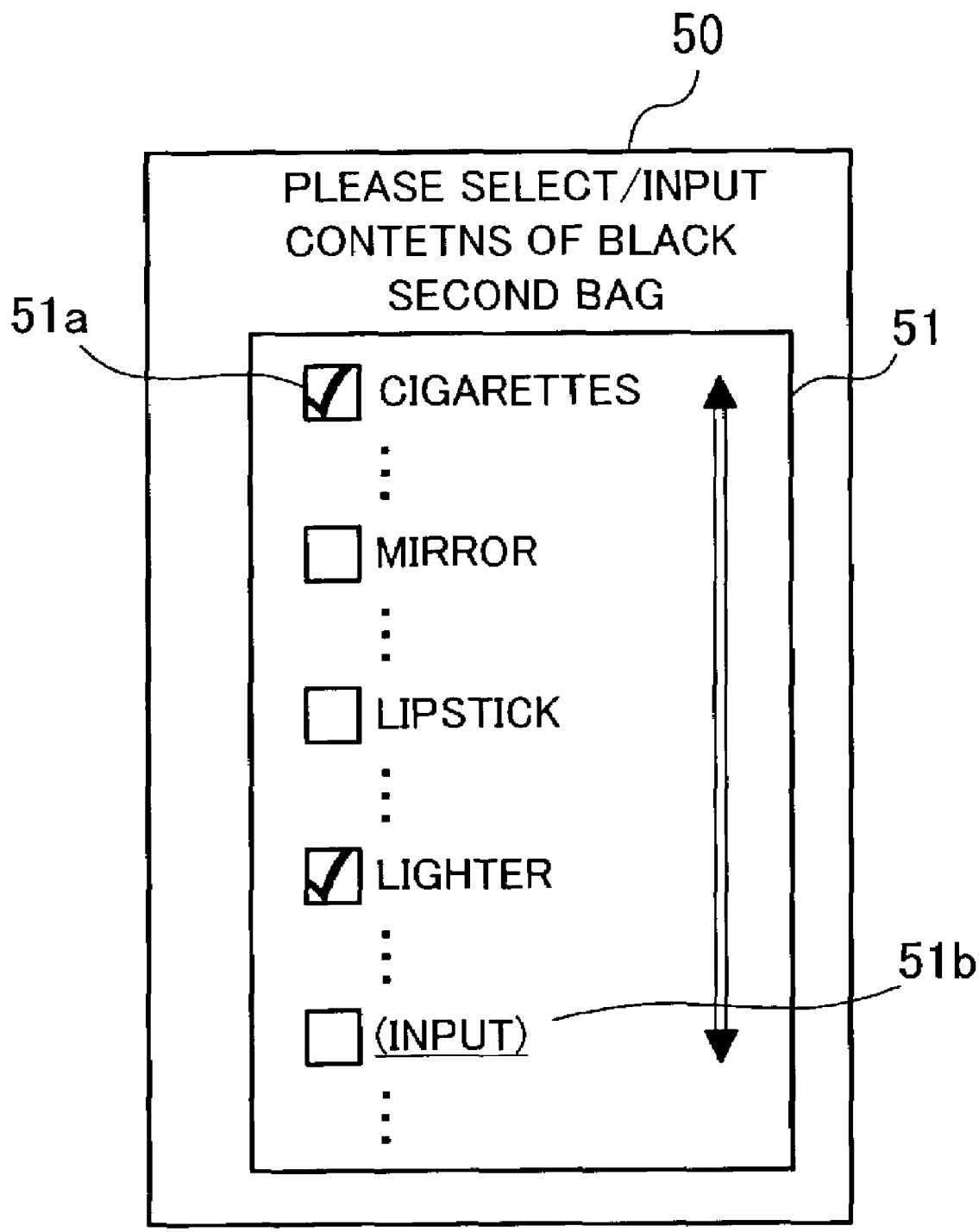
FIG. 13 is a diagram showing a selection/input screen which is displayed.

FIG. 13 shows a selection/input screen 50 by way of example. As shown in FIG. 13, the selection/input screen 50 has a selectable object display area 51. The selectable object display area 51 displays information as to selectable objects. In the example shown in FIG. 13, contents of a second bag are displayed as selectable objects. The contents displayed on the selected object display area 51 include information set as particular information of the selected found-item information and dummy data extracted by the found-item information management server 100.

The selectable object display area 51 contains selection areas 51a associated respectively with selectable objects. Each of the selection areas 51a is a check box for selecting the corresponding selectable object. The selectable object display area 51 also contains a desired particular information input area 51b which is a text box for entering the name of an object, other than the objects displayed as selectable objects, as particular information.

When the selection/input screen 50 is displayed, the owner selects a selectable object suitable as particular information of the lost item of the owner. In the example shown in FIG. 13, the owner selects objects placed in the lost second bag. In FIG. 13, the owner selects cigarettes and a lighter as particular information.

When selectable objects are selected on the selection/input screen 50, the terminal 203 displays a found-item information and confirmatory matter input screen on its display monitor.

FIG. 14 shows a found-item information and confirmatory matter input screen 60. As shown in FIG. 14, the found-item information and confirmatory matter input screen 60 has a found-item information display area 61, a found-item image display area 62, a particular information input area 63, and a disclosure permission/inhibition flag input area 64.

The found-item information display area 61 displays the contents of selected found-item information (except for secret information). In the example shown in FIG. 14, the found-item information display area 61 displays the identification number (No.), name, feature information, found location, and found date and time of the selected found-item information.

The found-item image display area 62 displays an enlarged image of a found item.

The particular information input area 63 is a text box for the owner to enter particular information (confirmatory matters) of its own lost item. When the found-item information and confirmatory matter input screen 60 is opened, an object selected on the selection/input screen 50 has already been set in the particular information input area 63. In the example shown in FIG. 14, cigarettes and a lighter have been set in the particular information input area 63. Each of input items of the particular information input area 63 has a button (indicated by a triangle) for opening a pull-down menu. When the button is clicked, a list of data that can be entered is displayed as a pull-down menu. The owner can enter necessary matters into the particular information input area 63 by selecting corresponding data from the pull-down menu.

The disclosure permission/inhibition flag input area 64 has check boxes associated with the respective input items of the particular information input area 63. Each of the check boxes represents a flag (disclosure permission/inhibition flag) indicative of whether the corresponding particular information is to be open to the public or not. If the check box is selected (with a check mark displayed), then the corresponding particular information can be open to the public.

When necessary data are entered in the found-item information and confirmatory matter input screen 60, the match determining unit 180 of the found-item information management server 100 checks if the found-item information matches the particular information or not. The determined result is sent from the found-item information management server 100 to the terminal 203. The terminal 203 then displays a match check result screen on its display monitor.

Figure 15:
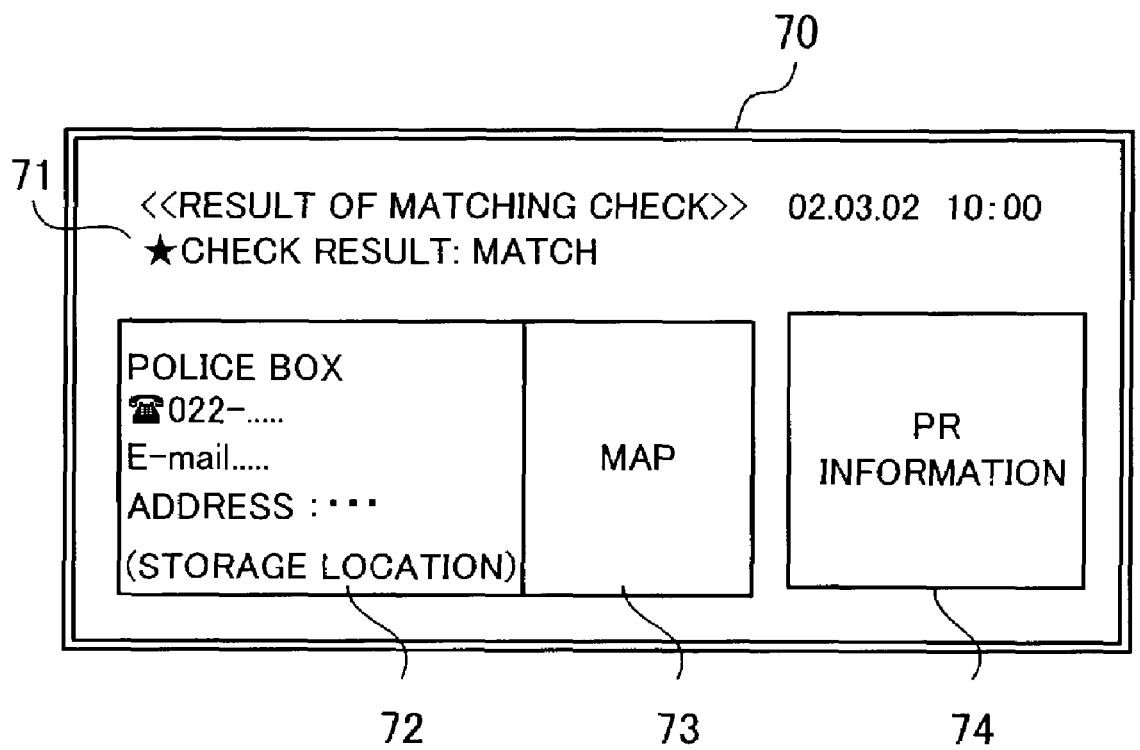
FIG. 15 is a diagram showing a match check result screen which is displayed.

FIG. 15 shows a match check result screen 70 by way of example. As shown in FIG. 15, the match check result screen 70 has a check result display area 71, a storage location display area 72, a storage location map display area 73, and a PR information display area 74.

The check result display area 71 displays a check result representing a match or an unmatch. In the example shown in FIG. 15, a "match" is displayed in the check result display area 71.

The storage location display area 72 displays a location where the found item is stored at present. For example, if the found item has been reported to the police box 22 and before it is transferred to the lost-item storage center 21, the storage location display area 72 displays the telephone number, address, etc. of the police box 22.

The storage location map display area 73 displays a map image of a route to the location where the found item is stored at present only if the check result represents a "match".

The PR information display area 74 displays PR information if the check result represents a "match" and PR information is set in the location where the found item is stored. For example, if the storage location is a police box, then the PR information display area 74 may display a traffic safety promotion message. If the storage location is a shop, then the PR information display area 74 may display sales information.

The owner confirms the match check result screen 70 to see if the found item selected on the similar found-item list screen 40 matches the item lost by the owner or not. If the found item selected on the similar found-item list screen 40 does not match the item lost by the owner, then the owner may go back to the similar found-item list screen 40 displayed on the terminal 203, select another found item, and ask the found-item information management server 100 to determine the newly selected found item matches the lost item or not.

When the process of reporting a lost item and determining whether a found item matches a lost item or not is finished, the printer connected to the terminal 203 prints a lost-item report. Specifically, a lost-item report is printed if a similar found item has not been detected, if a found item matching a lost item has been located among similar found items, or if a found item corresponding to a lost item has not been located among similar found items.

Figure 16:
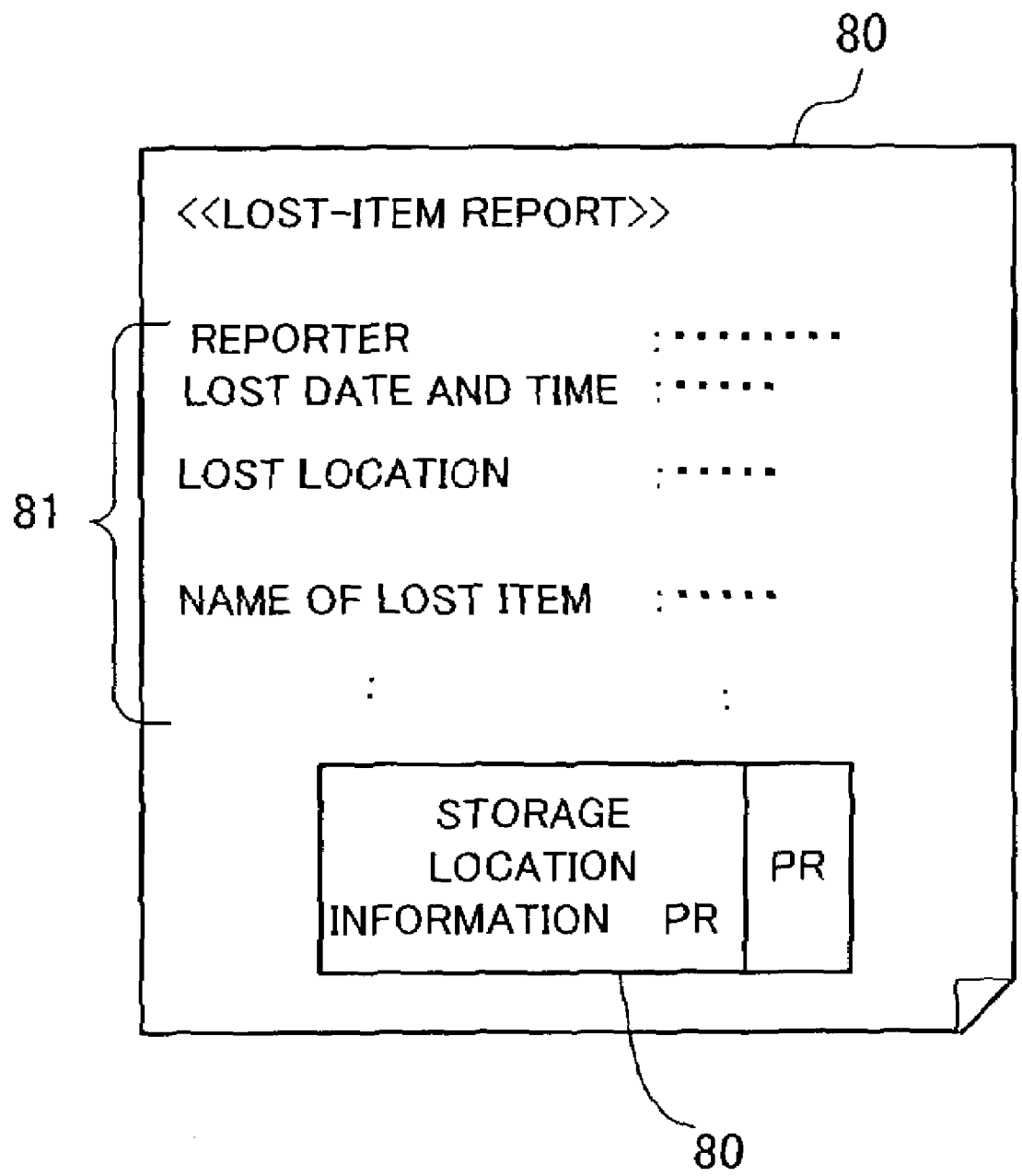
FIG. 16 is a diagram showing a lost-item report.

FIG. 16 shows an example of a lost-item report 80. The lost-item report 80 is a statement certifying that a lost item has been reported. The lost-item report 80 has a lost-item information display area 81 and a storage location information display area 82.

The lost-item information display area 81 contains printed pieces of lost-item information entered by the owner. For example, the lost-item information display area 81 contains a reporter, a lost date and time, a lost location, and a lost-item name which are printed.

The storage location information display area 82 contains printed information of a storage location where a found item is stored if the found item matches the lost item as a result of a matching check. If PR information is set in the storage location, the PR information is also printed in the storage location information display area 82.

The owner of a lost item reports the lost item by using the terminal 203 in the manner described above. In the present embodiment, since the owner of a lost item can report the lost item via the terminal 203 which is connected to the Internet 10, the owner can report the lost item as soon as the owner finds that the item has been lost.

A process of reporting a found item by a finder will be described below.

Figure 17:
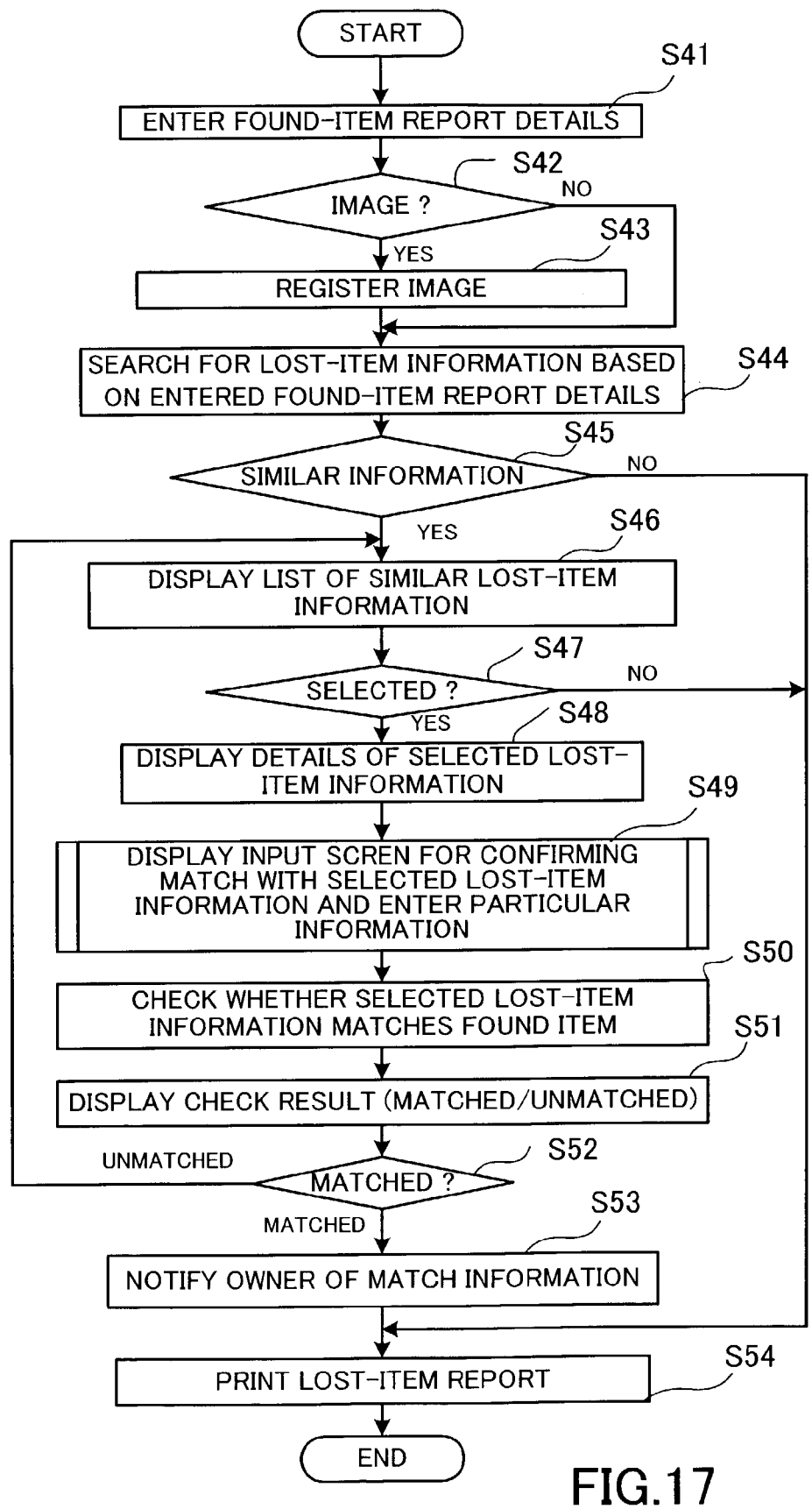
FIG. 17 is a flowchart of a process of reporting a found item.

FIG. 17 is a flowchart of a process of reporting a found item. The process of reporting a found item will be described below according to step numbers shown in FIG. 17.

[Step S41]
The finder of a found item enters found-item report details by using the terminal 204. The entered found-item report details are sent to the found-item information management server 100, and stored in the found-item information DB 120 by the found-item reporting processor 160.

[Step S42]
The finder determines whether there is an image of the found item or not. If there is an image of the found item, then process goes to step S43. If there is no image of the found item, then process goes to step S44.

[Step S43]
The finder sends the image data to the found-item information management server 100 by using the terminal 204. The image of the found item is stored in the found-item information management server 100, and the name of the image data is set in the column of images in the column of feature information (open to the public) in the found-item information DB 120 by the found-item reporting processor 160.

[Step S44]
The finder enters a request to search for lost-item information based on the details entered in step S41 into the terminal 204. The terminal 204 sends the retrieval request to the found-item information management server 100, in which the match determining unit 180 searches the lost-item information DB 110.

[Step S45]
The match determining unit 180 determines whether there is similar found-item information or not. If there is similar found-item information, then process goes to step S46. If there is no similar found-item information, then process goes to step S54.

[Step S46]
The match determining unit 180 sends information about a list of similar lost-item information to the terminal 204. The terminal 204 displays the list of similar lost-item information on its display monitor.

[Step S47]
The finder refers to the list of similar lost-item information displayed by the terminal 204, and selects, if any, lost-item information which appears to correspond to the finder's found item, using the terminal 204. If the finder selects lost-item information, process goes to step S48. If the finder selects no lost-item information, process goes to step S54.

[Step S48]
The terminal 204 requests the found-item information management server 100 to send details of the lost-item information selected by the finder. The information disclosing unit 170 of the found-item information management server 100 reads the details (which can be open to the public) of the selected lost-item information from the lost-item information DB 110, and sends the read details to the terminal 204. The terminal 204 displays the details of the selected lost-item information on its display monitor.

[Step S49]
The terminal 204 displays an input screen for the finder to confirm a match between the selected lost-item information and the found item of the finder. On the displayed input screen, the finder then enters particular information into the terminal 204. This process of entering particular information is the same as the process of entering particular information as shown in FIG. 10.

[Step S50]
The particular information which has been entered into the terminal 204 is sent from the terminal 204 to the found-item information management server 100. The match determining unit 180 checks whether the selected lost-item information matches the found item of the finder who operates the terminal 204, based on the particular information sent from the terminal 204.

[Step S51]
The match determining unit 180 sends the result of the matching check to the terminal 204, which displays the result of the matching check. The displayed result includes information indicating whether the selected lost-item information matches the found item or not.

[Step S52]
The terminal 204 determines from the result of the matching check whether the selected lost-item information matches the found item or not. If the selected lost-item information matches the found item, then process goes to step S53. If the selected lost-item information does not match the found item, then process goes back to step S46.

[Step S53]
The match determining unit 180 notifies the owner of the match information. For example, the match determining unit 180 sends an e-mail message to the owner, letting the owner know that the found-item information that matches the lost-item information registered by the owner has been registered.

[Step S54]

The terminal 204 prints a lost-item report on its printer.

In this manner, the found item is reported using the terminal 204. According to the present embodiment, since found items can be reported from any terminals connected to the Internet 10, found-item reports can be filed quickly. If a finder reports the found item together with a found-item report to a police box, then the finder does not need to answer detailed questions at the police box, and hence finds it less troublesome to report the found item.

According to the present embodiment, furthermore, the member shop 25 can temporarily keep found items. Therefore, a finder can report the found item at a member shop near the location where the finder has found the found item. The member shop may add shop's PR information to the found-item information for converting the trouble of keeping found items into an increase in the sales of merchandise at the shop.

Figure 18:
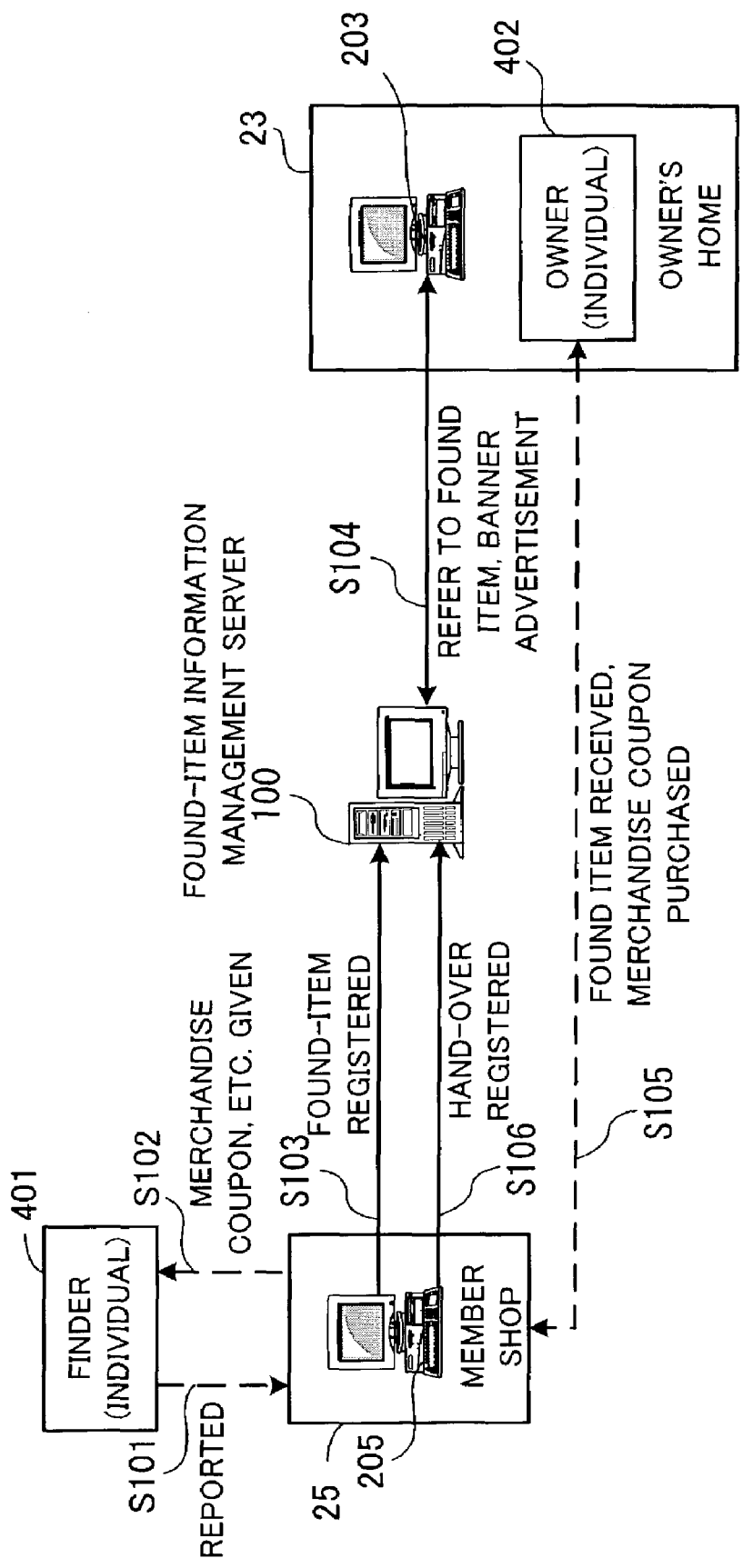
FIG. 18 is a conceptual diagram showing a process of registering a found item through a member shop.

FIG. 18 shows a process of registering a found item through a member shop. In FIG. 18, the transfer of information through a network is indicated by the solid-line arrows, and the manual hand-over of an object is indicated by the dotted-line arrows.

A finder 401 who has picked up a lost item reports the lost item to a nearby member shop 25 in step S101. The finder 401 receives a reward in the form of a merchandise coupon from the member shop 25 in step S102. The reward offered to the finder 401 may be a merchandise coupon ranging from 50 to 100 yen, or a discount coupon or a complimentary ticket for the member shop 25.

Using the terminal 205, the member shop 25 accesses the found-item information management server 100 and registers found-item information therein in step S103. At this time, the member shop 25 may transfer image data of the found item acquired by a digital camera or the like to the found-item information management server 100. In the found-item information management server 100, the found-item reporting processor 160 stores the found-item information in the found-item information DB 120.

An owner 402 who has lost the item accesses the found-item information management server 100 from the terminal 203 at the owner's home 23, and refers to the found item and a banner advertisement of the member shop 25 which keeps the found item. If the owner 402 finds the found item (the lost item of the owner), then the owner 204 goes to the member shop 25 and receives the lost item from the member shop 25. The owner 402 buys goods, something to drink or eat, or a merchandise coupon that is effective in a shopping area to which the member shop 25 belongs, instead of giving a reword to the finder 401 in step S105.

After having handed the found item over to the owner 402, the member shop 25 accesses the found-item information management server 100 from the terminal 205, and registers the hand-over of the found item to the owner 402.

Since the finder 401 can report the found item to the member shop 25 as described above, the found item can be reported quickly. With the found-item information being open to the public through the Internet, the owner 402 can immediately know the reporting of the lost item through the Internet.

Member shop specific information, other than the found-item information shown in FIG. 6, is added to the found-item information registered by the member shop 25.

FIG. 19 shows an example of member shop specific information added to the found-item information DB 120. As shown in FIG. 19, when a found item is brought into the member shop 25 and the found-item information is registered in the found-item information DB 120 by the terminal 205 at the member shop 25, member shop specific information is additionally registered in the found-item information DB 120.

The member shop specific information generally has a column of registering information, a column of merchandise coupon usage, and a column of processing details.

The column of registering information contains registered information specific to member shops. The column of registering information is subdivided into a column of shop numbers (No.), a column of persons in charge, a column of locations, and a column of comments. The column of shop numbers (No.) contains the identification numbers of member shops. The column of persons in charge contains the identification numbers of persons in charge of managing found items at member shops. The column of locations contains locations where found items are picked up with respect to the locations of member shops. For example, the column of locations contains information such as "within the shop", "near the shop", etc. The column of comments contains messages for owners who have lost found items. In the example shown in FIG. 19, the column of comments contains a message "We are waiting for you to visit us", and a message "We open at 18:00, and are closed on Sundays."

The column of merchandise coupon usage contains information as to whether a merchandise coupon can be used or not.

The column of processing details contains information as to how found items which are kept are processed. The column of processing details is subdivided into a column of present statuses, a column of dates and times, a column of comments, and a column of images. The column of present statuses contains information as to how found items are processed at present. For example, the column of present statuses contains information indicative of "storage (the found item is stored in the member shop)", "hand-over (the found item has been handed over to the owner)", and "transfer (the found item has been transferred to a public organization such as a police box)". The column of dates and times contains dates and times when found items have been processed. The column of comments contains supplemental matters with respect to processing details. For example, the column of comments contains the name of a facility (e.g., a Kokubun-cho police box) to which a found item has been transferred, and details of a reward (e.g., a merchandise coupon purchased at 1,000 yen) offered when a found item has been handed over. The column of images contains the name of an image certifying that a found item is handed over, for example.

The member shop specific information is registered at the same time that the found-item information from the terminal 205 at the member shop 25 is registered.

Figure 20:
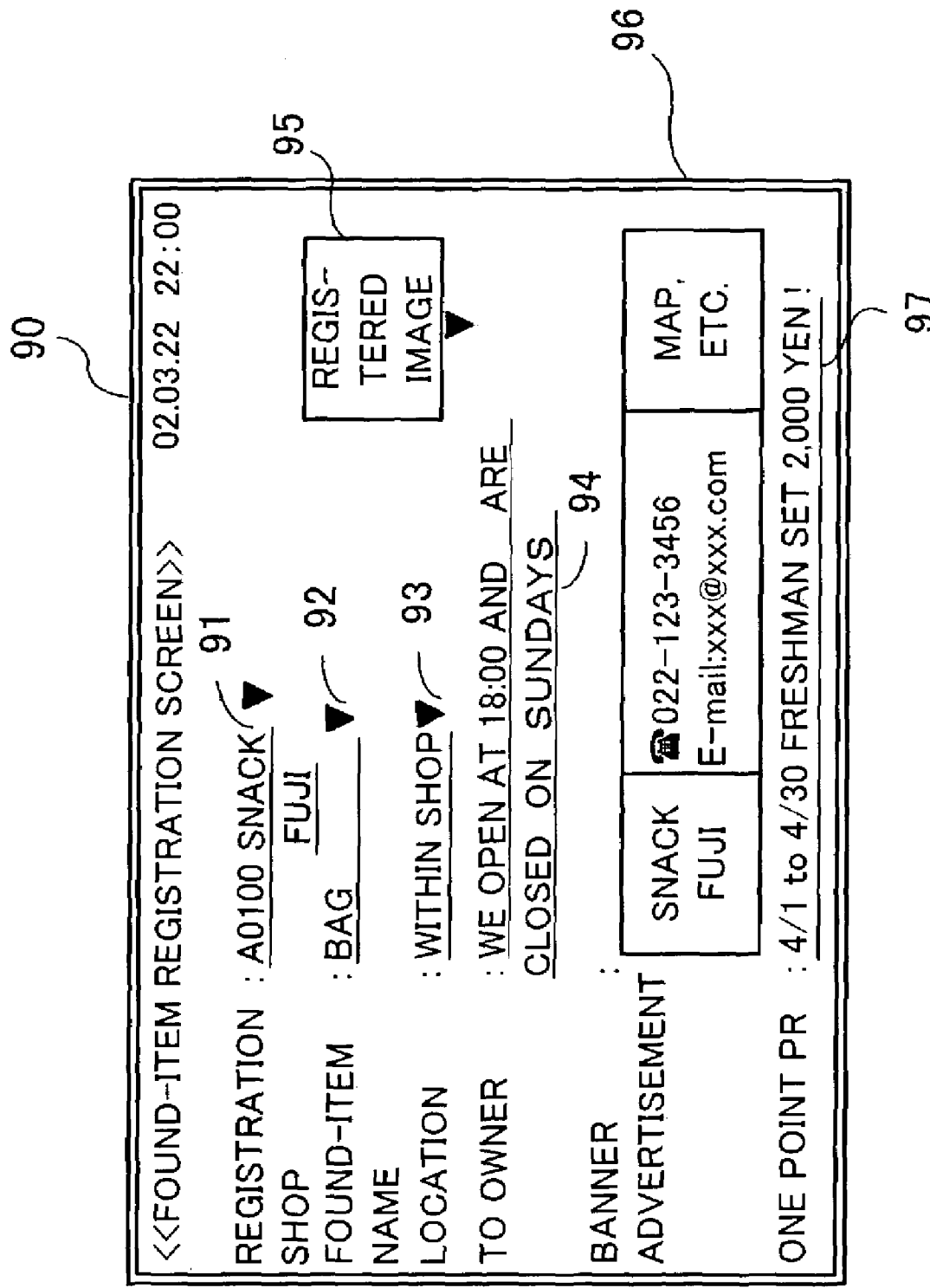
FIG. 20 is a diagram showing a found-item registration screen which is displayed.

FIG. 20 shows a displayed found-item registration screen 90. The found-item registration screen 90 has a registration shop input area 91, a found-item name input area 92, a found location input area 93, a message input area 94, an image registration area 95, a banner advertisement setting area 96, and a one-point PR input area 97.

The registration shop input area 91 displays the identification number of a shop which registers a found item and the name of the shop. In the example shown in FIG. 20, the registration shop input area 91 displays "A0100 Snack Fuji".

The found-item name input area 92 is a text box for entering the name of a found item. In the example shown in FIG. 20, a found-item name "bag" is entered in the found-item name input area 92.

The found location input area 93 is a text box for entering a location where the found item is picked. In the example shown in FIG. 20, a found location "within the shop" is entered in the found location input area 93.

The message input area 94 is a text box for entering a message for the owner. In the example shown in FIG. 20, a message "We open at 18:00, and are closed on Sundays."

The image registration area 95 is a setting area for registering an image of the found item.

The banner advertisement setting area 96 is a setting area for registering a banner advertisement of the member shop.

The one-point PR input area 97 is a text box for entering PR information from the member shop. In the example shown in FIG. 20, PR information "4/1 to 4/30 Freshman set 2,000 yen" is entered in the one-point PR input area 97. Immediately after the displayed found-item registration screen 90 is displayed, the one-point PR input area 97 displays contents registered when the previous found item was registered in the same member shop. The member shop rewrites, if necessary, the one-point PR displayed in an initial state.

In the example shown in FIG. 20, only main items of information (the name of a found item and the location where it has been picked up, etc.) are illustrated as information about a found item. However, as with the lost-item reporting screen 30 shown in FIG. 11, feature information (open to the public), particular information (not open to the public), date and time when the found item has been picked up, etc. are also entered.

Each of the registration shop input area 91, the found-item name input area 92, the found location input area 93, and the message input area 94 has a button (indicated by a triangle) for opening a pull-down menu. When the button is clicked, a list of data that can be entered is displayed as a pull-down menu. The person in charge at the member shop can enter necessary matters into each of the registration shop input area 91, the found-item name input area 92, the found location input area 93, and the message input area 94 by selecting corresponding data from the pull-down menu. For example, when the button associated with the message input area 94 is clicked, the message input area 94 displays a history of past comments from which the person in charge can select a desired comment.

By thus registering the member shop specific information together with the found-item information, it becomes possible for an owner who refers to the found-item information to see a banner advertisement of the member shop.

FIG. 21 shows a displayed found-item list screen 310 by way of example. In FIG. 21, the found-item list screen 310 displays a list of found items whose names are "bag" and which have been picked up after Mar. 20, 2002 (02-03-20) at the location "Kokubun-cho". The found-item list screen 310 has a found-item list display area 311, a banner advertisement display area 312, and an attention display area 313.

The found-item list display area 311 displays a list of found items that match specified conditions. The found-item list display area 311 also displays images (reduced images) of found items in association with displayed storage locations and found locations. Comments for the owners are also displayed within display areas of the storage locations and found locations. When a reduced image of a found item is clicked, i.e., when a reduced image is indicated by a mouse cursor and a mouse button is pressed, an enlarged image of the found item is displayed. When the name of a member shop is clicked, an enlarged banner advertisement of the member shop is displayed.

The banner advertisement display area 312 displays banner advertisements of member shops which store found items. The frequency with which and the period for which banner advertisements are displayed may be controlled depending on the contribution (the number of registered found items and the number of processed found items) which member shops providing those banner advertisements give. Specifically, a banner advertisement of a member shop whose contribution is greater may be displayed with priority. Banner advertisements may be limited to those shops in a region referred to ("Kokubun-cho" in the example shown in FIG. 21).

The attention display area 313 displays attentions to be noted when an owner receives the found item (the lost item for the owner). For example, the attention display area 313 may be used to explicitly express, on a Web site, requests that member shops have, but find it difficult to say directly in the shops.

If an owner finds the lost item after having confirmed found items displayed on the found-item list screen 310, then the owner carries a lost-item report to the member shop 25 which is holding the lost item. The owner makes a predetermined purchase at the member shop 25, and receives the lost item from the member shop 25.

After having handed the kept found item (the lost item for the owner) over to the owner, the member shop 25 enters processing details into the found-item information management server 100 using the terminal 205.

FIG. 22 shows an example of a displayed found-item processing input screen 320. As shown in FIG. 22, the found-item processing input screen 320 has a member shop display area 321, a processed detail input area 322, and a banner advertisement display area 323.

The member shop display area 321 displays information about a member shop which enters found items. For example, the member shop display area 321 displays the identification number "A010" and name "Snack Fuji" of a member shop.

The processed detail input area 322 is an input area for entering processed results of found items that are kept by the member shop 25. The processed detail input area 322 has a column of registration dates, a column of names, a column of images, a column of processed details, and a column of comments. The column of registration dates displays the dates when found items that are kept by the member shop 25 are registered. The column of names displays the names of found items kept by the member shop 25. The column of images displays the images of found items kept by the member shop 25. The column of processed details can have entered therein the processed details of found items kept by the member shop 25. For example, if a found item kept by the member shop 25 is transferred to a police box, then "transferred" is entered in the column of processed details. Additional comments regarding processed details are entered in the column of comments.

Each of the input items in the column of processed details and the column of comments has a button (indicated by a triangle) for opening a pull-down menu. When the button is clicked, a list of data that can be entered is displayed as a pull-down menu. The person in charge at the member shop can enter necessary matters into each of the column of processed details and the column of comments by selecting corresponding data from the pull-down menu.

The banner advertisement display area 323 displays a banner advertisement. In the example shown in FIG. 22, details of one-point PR are displayed as a banner advertisement in the banner advertisement display area 323.

As described above, since a member shop keeps a found item, and gives a reward to the finder in exchange for the found item, the reporting of found items is motivated and promoted. The found-item information is made open to the public through the Internet or the like, allowing the owner to receive the lost item early with a high probability.

Because particular information of the found-item information is not open to the public, it is possible to prevent third parties from committing unlawful actions based on owner masquerading. Preventing owner masquerading makes it more likely for lost items to be handed over to lawful owners.

As a match between lost-item information entered by an owner and particular information of found-item information is judged, the lost item can be confirmed as matching the found item when the lost item is reported. Therefore, the found item can quickly be handed over to the owner without having to confirming whether the owner is a lawful owner or not.

If a similar found item is reported after a lost item is reported, then the owner is notified of the reported similar found item. The owner, therefore, can be aware of the reporting of the lost item without having to monitor details of found-item information.

By making lost-item information open to the public, it is possible to let the public know that the owner is looking for the lost item. As a result, the finder who has found an item, which may look worthless but is actually important for the owner, is encouraged to report the found item early.

If each of the shops belonging to a shopping area is a member shop, then the finder of a lost item in the shopping area can report it as a found item to one of the member shops without going to a police box. Therefore, the process of reporting a found item is shortened.

If the owner does not show up within a given period of time (6 months in Japan) after a found item has been reported, then the finder is notified of the absence of the owner. Consequently, the finder which has acquired the right to have the found item can own the found item reliably.

When the finder of a found item reports the found item to a member shop, the finder is given a reward at the time and place the found item is reported. Therefore, the reporting of found items is motivated and promoted. As a result, the owner can recover the lost item early with a high probability.

A member shop can submit found-item information and a banner advertisement with priority by keeping a found item. The member shop can thus advertise itself and increase its own prestige. The owner of a lost item which is kept by the member shop visits the member shop to recover the lost item. This scheme is effective to attract customers to member shops and a region or shopping area to which the member shops belong, activating business activities and transactions in such a region or shopping area.

Processed information of found items is open to the public through Web pages, so that the owner of a lost item can recognize the present storage location of the lost item through the Internet.

In the above embodiment, when the owner of a lost item enters particular information of the lost item, the owner can specify particular information in a hierarchical body of particular information ranging from particular information entered in wide-concept words to particular information entered in specific-concept words. To allow the owner to specify particular information, the found-item information management server 100 has item particular information stored in advance therein.

FIG. 23 shows a data structure of item particular information 410. The item particular information 410 has a column of item names, a column of particular categories, and a column of particular information.

The column of item names contains wide-concept item names (general names of items) entered as particular information. Those wide-concept item names include "lighter" and "cigarettes", for example.

The column of particular categories contains the identification numbers and names of categories used to specify particular information indicated by item names. For example, the identification numbers and names of categories for the item name "lighter" are "1 kind" and "2 color".

The column of particular information contains choices for particular categories. For example, choices "throwaway", "gas chargeable", and "oil" are provided for the item name "lighter", the particular category "1 kind".

The found-item information management server 100 provides the terminal 230 with the item particular information 410 which contains choices of particular information, thus permitting the owner who uses the terminal 203 to specify particular information in a hierarchical body of particular information.

Figure 24:
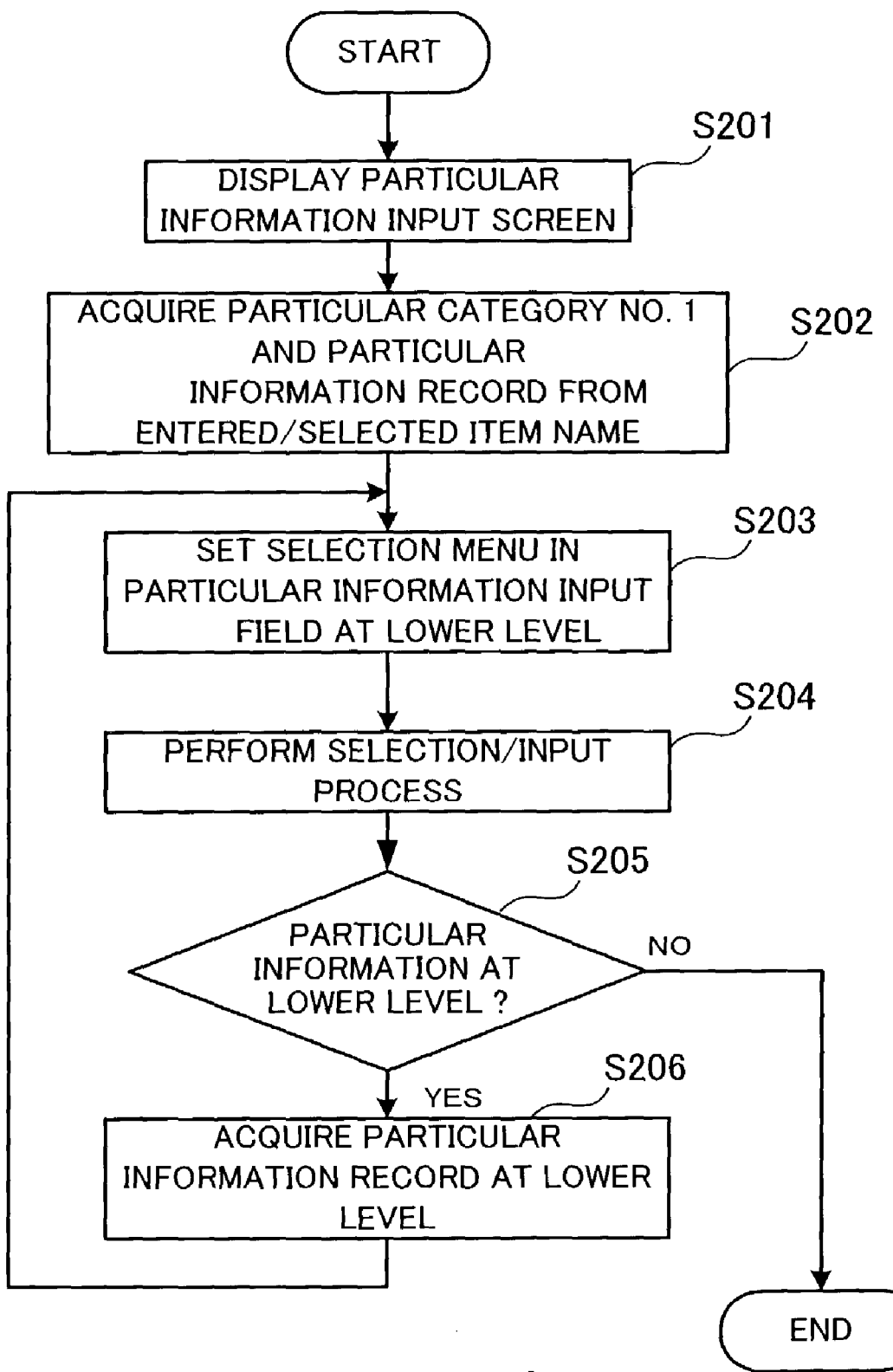
FIG. 24 is a flowchart of a process of specifying particular information.

FIG. 24 is a flowchart of a process of specifying particular information. The process of specifying particular information will be described below according to step numbers shown in FIG. 24.

[Step S201]

The terminal 203 accesses the found-item information management server 100, and displays a particular information input screen on its display monitor.

[Step S202]

The found-item information management server 100 refers to the item particular information 410, acquires a particular information record of the particular category No. 1 (various data in the column of particular information which correspond to the corresponding particular category) from the entered/selected item name, and sends the acquired particular information record as menu details to the terminal 203.

[Step S203]

The terminal 203 sets a selection menu in a particular information input field at a lower level on the particular information input screen.

[Step S204]

When an item name is specified on the particular information input screen, the terminal 203 displays a selection menu for particular information corresponding to the item. The terminal 203 receives a selected input from the selection menu. The terminal 203 sets details of selected particular information on the particular information input screen, and sends the details of selected particular information to the found-item information management server 100.

[Step S205]

The found-item information management server 100 determines whether there is a particular category at a lower level (whose identification number is next) or not. If there is a particular category at a lower level, then process goes to step S206. If not, then the process is ended.

[Step S206]

The found-item information management server 100 acquires a particular information record in the particular category at the lower level from the item particular information 410, and sends the particular information record to the terminal 203. Then, process goes back to step S203.

Figure 25:
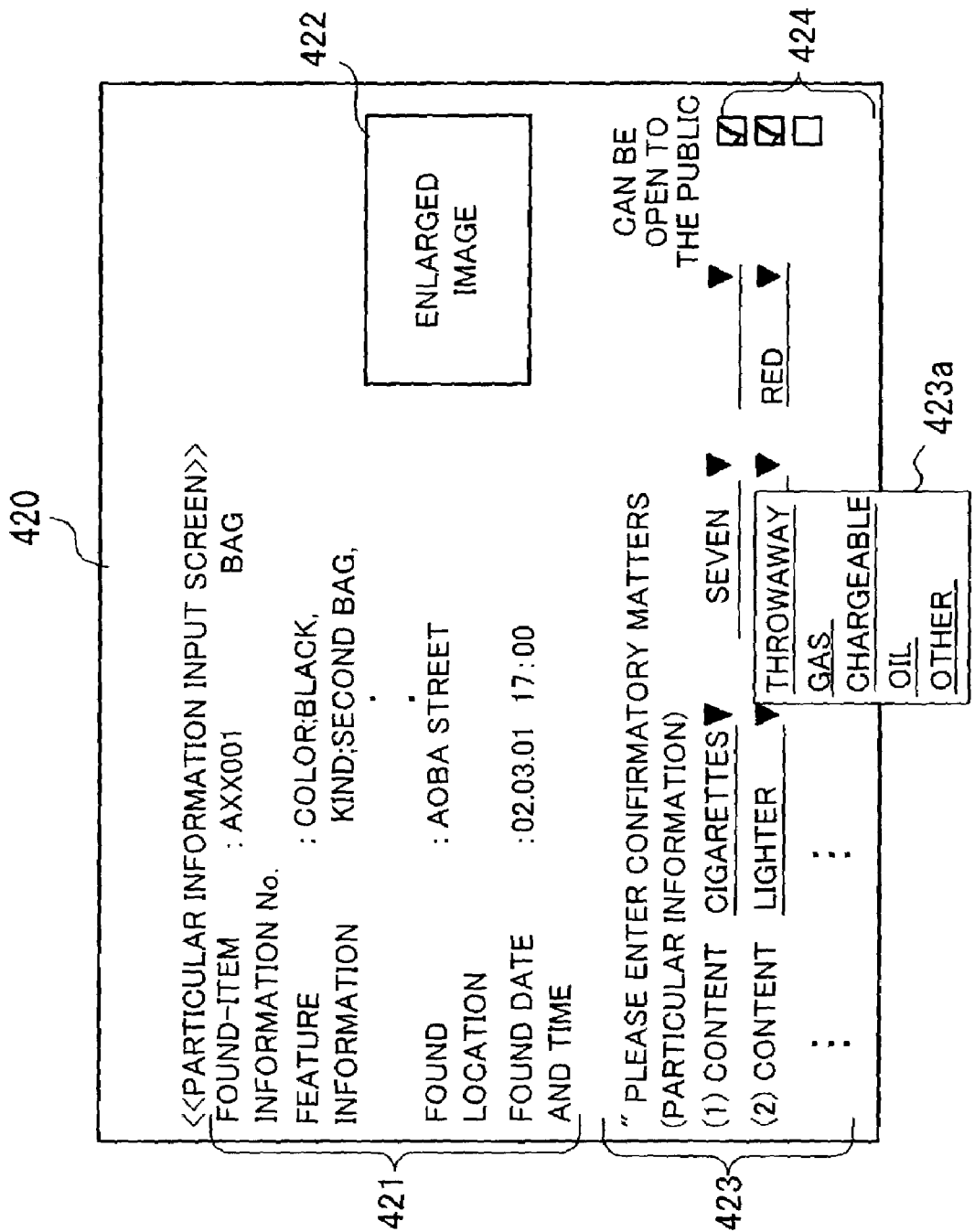
FIG. 25 is a diagram showing a displayed particular information input screen for specifying particular information.

FIG. 25 shows, by way of example, a displayed particular information input screen 420 for specifying particular information. The particular information input screen 420 has a found-item information display area 421, a found-item image display area 422, a particular information input area 423, and a disclosure permission/inhibition flag input area 424.

The found-item information display area 421 displays the contents of selected found-item information (except for secret information). In the example shown in FIG. 25, the found-item information display area 421 displays the identification number (No.), name, feature information, found location, and found date and time of the selected found-item information.

The found-item image display area 422 displays an enlarged image of a found item.

The particular information input area 423 is a text box for the owner to enter particular information (confirmatory matters) of its own lost item. In the example shown in FIG. 25, item names such as cigarettes and a lighter have been set in the particular information input area 423.

The particular information input area 423 also as input items for entering specific particular information alongside of the item names. Each of the input items or entering specific particular information has a button (indicated by a triangle) for opening a pull-down menu 423a. When the button is clicked, a list of particular information that can be entered is displayed as a pull-down menu 423a. The owner can enter necessary matters into an input item of particular information by selecting corresponding data from the pull-down menu 423a. In the example shown in FIG. 25, the pull-down menu 423a for entering specific particular information for the item name "lighter" includes particular information representing "throwaway", "gas chargeable", "oil", "other".

The disclosure permission/inhibition flag input area 424 has check boxes associated with the respective input items of the particular information input area 423. Each of the check boxes represents a flag (disclosure permission/inhibition flag) indicative of whether the corresponding particular information is to be open to the public or not. If the check box is selected (with a check mark displayed), then the corresponding particular information can be open to the public.

When particular information is entered as a wide-concept item name, the owner selects specific properties (color, kind, etc.) relative to the item for determining a match or an unmatch more accurately.

The above various processing functions can be realized by a server computer of a client-server system. Specifically, there is provided a server program containing a description of processing details of the functions which the found-item information management server 100 is to have. The server computer executes the server program in response to a request from a client computer. The above processing functions are performed by the server computer, and results of the performed processing functions are sent from the server computer to the client computer.

The server program containing the description of processing details can be recorded on a recording medium which can be read by the server computer. The recording medium which can be read by the server computer may be a magnetic recording device, an optical disk, a magneto-optical recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disc Read Only Memory), a CD-R (Recordable)/RW (ReWritable), or the like. The magneto-optical recording medium may be an MO (Magneto-Optical) disc or the like.

For distributing the server program, portable recording mediums such as DVDs, CD-ROMs, etc. which store the server program are put on sale.

The server computer for executing the server program loads the server program recorded on a portable recording medium, for example, into its own storage device. Then, the server computer reads the server program from the storage device, and performs a processing sequence according to the server program. Alternatively, the server computer may directly read the server program from the portable recording medium and perform a processing sequence according to the server program.

According to first, third, and fourth aspects of the present invention as described above, in response to a request for referring to found-item information, the found-item information except for particular information is transmitted, and a match between entered lost-item information and the particular information of the found-item information is determined. Therefore, although the found-item information can be referred to through a network, unlawful actions such as owner masquerading can be prevented. As a result, the owner of a lost item can locate the lost item early and can receive the lost item early by referring to found-item information via a large-area network.

According to a second aspect of the present invention, in response to a request for referring to found-item information, the found-item information is transmitted together with advertisement information provided by a shop which is keeping the found item. Therefore, the shop can expect an advertising effect by keeping the found item. As more shops which can keep found items participate, the trouble that finders have to take in reporting found items is reduced. As a result, lost items are quickly reported as found items, and are quickly received by their owners.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A found-item information management server for managing information about lost items, comprising:

found-item reporting means for accepting found-item information about a found item which is entered from a first terminal via a network, and registering the found-item information, partly as secret particular information, in a found-item information database;

information disclosing means for sending the found-item information registered in said found-item information database, except for said particular information, to a second terminal in response to a request, which is entered from said second terminal via said network, to refer to said found-item information;

match determining means for accepting lost-item information about a lost item which is entered from said second terminal via said network, determining a match between said lost-item information and said particular information stored in said found-item information database, and sending a determined result to said second terminal;

lost-item reporting means for accepting lost-item information about a lost item which is entered from said second terminal via said network, and registering the lost-item information, partly as secret particular information, in a lost-item information database;

said match determining means comprising means for determining a match between said lost-item information registered in said lost-item information database and said found-item information registered in said found-item information database, wherein said lost-item reporting means comprises means for accepting reporter information including contact information of an owner who has lost said lost item, as well as said lost-item information, from said second terminal, and registering said reporter information in a reporter information database, and said match determining means comprises means for determining a match with said found-item information registered in said found-item information database after said lost-item information is registered, and if said lost-item information and said found-item information match each other, indicating the match to said owner based on said reporter information.

* * * * *